United States Patent
Lozi et al.

(10) Patent No.: US 11,537,579 B2
(45) Date of Patent: Dec. 27, 2022

(54) FAST IN-MEMORY TECHNIQUE TO BUILD A REVERSE CSR GRAPH INDEX IN AN RDBMS

(71) Applicant: Oracle International Corporation, Redwood Shores, CA (US)

(72) Inventors: Jean-Pierre Lozi, Zurich (CH); Marco Arnaboldi, Zurich (CH); Laurent Phillipe Daynes, Saint-Ismier (FR); Vlad Ioan Haprian, Zurich (CH); Hugo Kapp, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 16/816,686

(22) Filed: Mar. 12, 2020

(65) Prior Publication Data
US 2021/0286790 A1 Sep. 16, 2021

(51) Int. Cl.
*G06F 16/22* (2019.01)
*G06F 16/21* (2019.01)

(52) U.S. Cl.
CPC ........ *G06F 16/2237* (2019.01); *G06F 16/212* (2019.01)

(58) Field of Classification Search
CPC . G06F 16/2237; G06F 16/212; G06F 16/9024
See application file for complete search history.

(56) References Cited

U.S. PATENT DOCUMENTS

| 5,822,592 A | 10/1998 | Zhu |
| 7,624,081 B2 | 11/2009 | Zhao et al. |
| 8,996,492 B2 | 3/2015 | Paradies et al. |
| 9,195,941 B2 | 11/2015 | Mojsilovic et al. |

(Continued)

FOREIGN PATENT DOCUMENTS

| WO | WO2015099562 A1 | 7/2015 |
| WO | WO 2015099562 A1 | 7/2015 |

OTHER PUBLICATIONS

Zhou et al., "Implementing Database Operations Using SIMD Instructions", ACM SIGMOD '2002 Jun. 4-6, Madison, Wisconsin, USA, 12 pages.

(Continued)

*Primary Examiner* — Hares Jami
(74) *Attorney, Agent, or Firm* — Hickman Becker Bingham Ledesma LLP; Brian N. Miller

(57) ABSTRACT

In an embodiment, a computer obtains a mapping of a relational schema of a database to a graph data model. The relational schema identifies vertex table(s) that correspond to vertex type(s) in the graph data model and edge table(s) that correspond to edge type(s) in the graph data model. Each edge type is associated with a source vertex type and a target vertex type. Based on that mapping, a forward compressed sparse row (CSR) representation is populated for forward traversal of edges of a same edge type. Each edge originates at a source vertex and terminates at a target vertex. Based on the forward CSR representation, a reverse CSR representation of the edge type is populated for reverse traversal of the edges of the edge type. Acceleration occurs in two ways. Values calculated for the forward CSR are reused for the reverse CSR. Elastic and inelastic scaling may occur.

35 Claims, 9 Drawing Sheets

(56) References Cited

U.S. PATENT DOCUMENTS

| | | | |
|---|---|---|---|
| 10,545,917 | B2 | 1/2020 | Dageville et al. |
| 10,599,656 | B1 | 3/2020 | Sharma |
| 2006/0117036 | A1 | 6/2006 | Cruanes et al. |
| 2010/0211924 | A1* | 8/2010 | Begel .................. G06F 16/9024 717/101 |
| 2011/0307685 | A1 | 12/2011 | Song |
| 2013/0318067 | A1 | 11/2013 | Sukhwani et al. |
| 2015/0026158 | A1 | 1/2015 | Jin |
| 2015/0138206 | A1 | 5/2015 | Mizell |
| 2015/0310644 | A1* | 10/2015 | Zhou ....................... G06F 17/16 345/440 |
| 2016/0019228 | A1 | 1/2016 | Hong |
| 2016/0063037 | A1 | 3/2016 | Savkli |
| 2016/0063132 | A1 | 3/2016 | Chen et al. |
| 2016/0071233 | A1* | 3/2016 | Macko .................. G06T 11/206 345/440 |
| 2016/0078344 | A1 | 3/2016 | Agarwal et al. |
| 2016/0140152 | A1 | 5/2016 | Sevenich et al. |
| 2016/0179887 | A1 | 6/2016 | Lisonbee et al. |
| 2016/0299991 | A1 | 10/2016 | Hong et al. |
| 2016/0350662 | A1* | 12/2016 | Jin ......................... G06F 16/245 |
| 2018/0081946 | A1 | 3/2018 | Bondalapati et al. |
| 2018/0246986 | A1* | 8/2018 | Haubenschild ..... G06F 16/9024 |
| 2018/0357329 | A1 | 12/2018 | Meyer |
| 2019/0121810 | A1 | 4/2019 | Zhuang |
| 2019/0197159 | A1 | 6/2019 | Balkesen et al. |
| 2019/0325075 | A1* | 10/2019 | Hilloulin ............. G06F 16/2237 |
| 2020/0265090 | A1 | 8/2020 | Hilloulin |
| 2021/0081410 | A1 | 3/2021 | Chavan et al. |
| 2021/0224235 | A1* | 7/2021 | Arnaboldi ............... G06F 16/27 |

OTHER PUBLICATIONS

Xirogiannopoulos et al., "Extracting and Analyzing Hidden Graphs from Relational Databases", ACM, SIGMOD dated 2017, 18 pages.
Wheatman et al., "Packed Compressed Sparse Row: A Dynamic Graph Representation", dated 2018,7 pages.
Valiyev, Mahammad, "Graph Storage: How Good is CSR Really?", dated Dec. 10, 2017, 8 pages.
SQL Server Blog, "Graph Data Processing with SQL Server 2017 and Azure SQL Database", dated Aug. 20, 2017, 8 pages.
Oracle, "Using Property Graphs in an Oracle Database Environment", docs.oracle.com/database/122/SPGDG/using-property-graphs-oracle-database.htm#BDSPA191, Apr. 23, 2018, Apr. 23, 2018, 152 pages.
Oracel Help Center, "ROWID Pseudocolum", dated Nov. 20, 2019, 2 pages.
Oracel Help Center, "Pseudoclumns", dated Nov. 20, 2019, 1 page.
Mathew et al., "An Efficient Index based Query handling model for Neo4j", International Journal of Advances in Computer Science and Technology (IJACST), vol. 3 No. 2, dated 2014, 7 pages.
Kesheng Wu et al., "A Performance Comparison of Bitmap Indexes", proceedings of the 2001 ACM CIKM 10th International Conference on Information and Knowledge Management, dated Oct. 5, 2001, 2 pages.
Kaur, Sawinder, "Visualizing Class Diagram Using OrientDB NoSQL Data-Store", dated Jul. 2016, 5 pages.
IMB Knowledge Center, "Expand Your IBM Z Capabilities", dated Nov. 20, 2019, 3 pages.
Hong et al., "PGX.D: A Fast Distributed Graph Processing Engine", SC, dated Nov. 2015, Austin TX, USA, 12 pages.
Hassan, "Extending In-Memory Relational Database Engines with Native Graph Support", dagted Mar. 2018, 12 pages.
Dave et al., "GraphFrames: An Integrated API for Mixing Graph and Relational Queries", ACM, dated 2016, 8 pages.
Cruanes, U.S. Appl. No. 15/716,345, filed Sep. 26, 2017, Notice of Allowance, dated Nov. 21, 2019.
Anonymous, "Universally Unique Identifer", Wikipedia, dated Feb. 13, 2018, www.web/2018020325/https://en.wikipedia.org/wiki/Universally_unique_identifer, 10 pages.
Ahmed Elgohary et al., "Compressed Linear Algebra for Large-Scale Machine Learning", VLDB Journal, No. 27, No. 5, dated Sep. 12, 2017, pp. 719-744.
Hillolin, U.S. Appl. No. 15/956,115, filed Apr. 18, 2018, Office Action, dated Dec. 4, 2020.
Zhang et al., "Strategies for Using Additional Resources in Parallel Hash-based Join Algorithms", dated 2004, 10 pages.
Martin et al., "Parallel Hash-Based Join Algorithms for a Shared-Everything Environment", dated Sep. 23, 1996, 43 pages.
Alcantara et al., "Real-Time Parallel Hashing on the GPU", dared 2009, 9 pages.
Hilloulin, U.S. Appl. No. 15/956,115, filed Apr. 18, 2018, Office Action, dated Jun. 19, 2020.
Hilloulin, U.S. Appl. No. 16/280,591, filed Feb. 20, 2019, Office Action, dated Jul. 12, 2021.
Hilloulin, U.S. Appl. No. 15/956,115, filed Apr. 18, 2018, Notice of Allowance, dated May 7, 2021.
Chavan, U.S. Appl. No. 17/018,018, filed Sep. 11, 2020, Non-Final Rejection, dated Jan. 5, 2022.
Bartolini, U.S. Appl. No. 15/956,115, filed Apr. 18, 2018, Notice of Allowance and Fees Due, dated Aug. 18, 2021.
Bartolini, U.S. Appl. No. 15/956,115, filed Apr. 18, 2018, Notice of Allowance and Fees Due, dated Jun. 17, 2021.
Arnaboldi, U.S. Appl. No. 16/747,827, filed Jan. 21, 2020, Office Action, dated Apr. 21, 2021.
Arnaboldi, U.S. Appl. No. 16/747,827, filed Jan. 21, 2020, Notice of Allowance, dated Jun. 9, 2021.
Chavan, U.S. Appl. No. 17/018,018, filed Sep. 11, 2020, Final Rejection, dated Apr. 20, 2022.
Paredes et al., "Exploiting Parallelism and Vectorisation in Breadth-First Search for the Intel Xeon Phi", IEEE Transactions on Parallel and Distributed Systems, vol. 31, No. 1, dated Jan. 2020, 16 pages.
Padmanabhan, "HDB-Subdue, A Relational Database Approach to Graph Mining and Hierarchical Reduction", Dec. 2005, 99 pages.

* cited by examiner

FIG. 1B

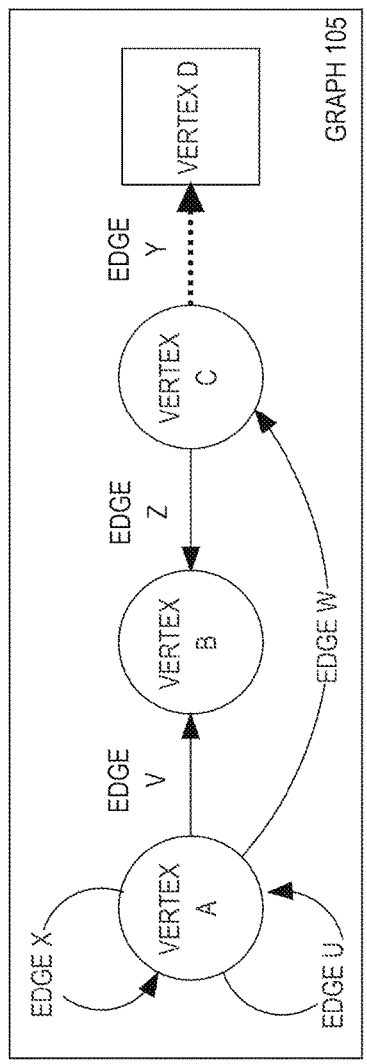

COMPUTER 100

GRAPH 105

| REVERSE COMPRESSED SPARSE ROW 115 |
|---|

| REVERSE DESTINATION ARRAY 117 |||
|---|---|---|
| VERTEX POSITION | TARGET VERTEX | REVERSE EDGE POSITION |
| 0 | A | 0 |
| 1 | B | 2 |
| 2 | C | 4 |
| TOTAL EDGE COUNT || 5 |

| REVERSE SOURCE ARRAY 119 ||||
|---|---|---|---|
| REVERSE EDGE POSITION | FORWARD EDGE POSITION | EDGE | SOURCE VERTEX | VERTEX POSITION |
| 0 | 0 | U | A | 0 |
| 1 | 3 | X | A | 0 |
| 2 | 1 | V | A | 0 |
| 3 | 4 | Z | C | 2 |
| 4 | 2 | W | A | 0 |

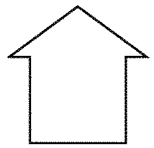

| FORWARD COMPRESSED SPARSE ROW 110 |
|---|

| FORWARD SOURCE ARRAY 190 |||
|---|---|---|
| VERTEX POSITION | SOURCE VERTEX | FORWARD EDGE POSITION |
| 0 | A | 0 |
| 1 | B | 4 |
| 2 | C | 4 |
| TOTAL EDGE COUNT || 5 |

| FORWARD DESTINATION ARRAY 195 |||
|---|---|---|
| FORWARD EDGE POSITION | EDGE | TARGET VERTEX | VERTEX POSITION |
| 0 | U | A | 0 |
| 1 | V | B | 1 |
| 2 | W | C | 2 |
| 3 | X | A | 0 |
| 4 | Z | B | 1 |

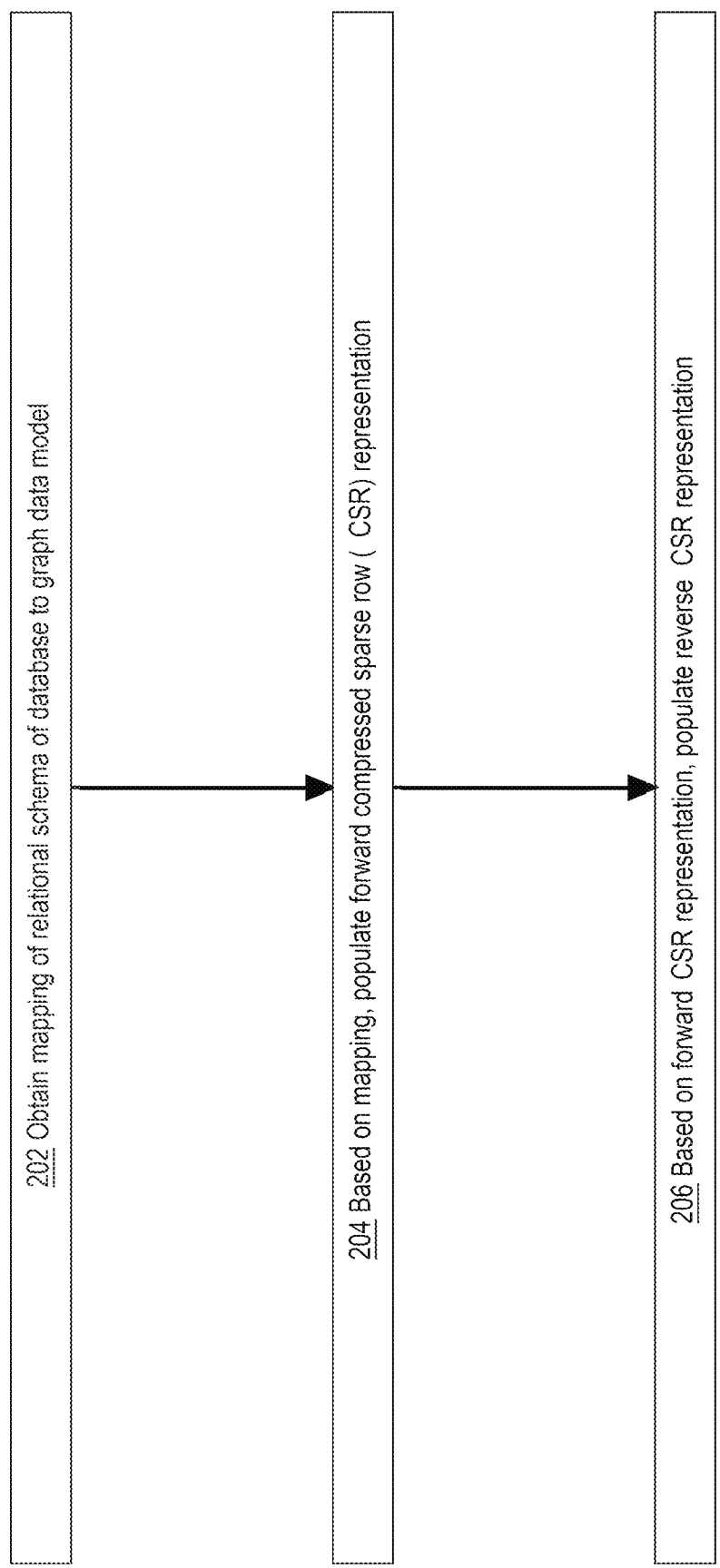

FIG. 4

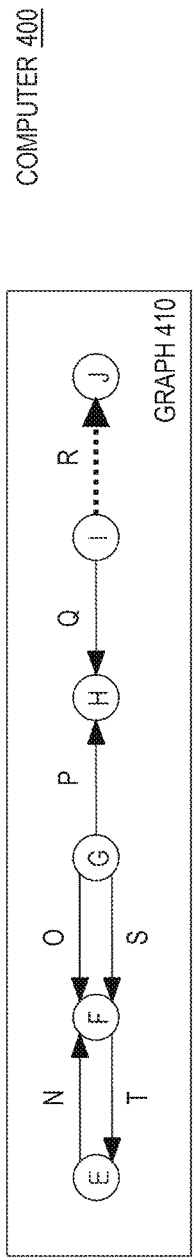

COMPUTER 400

GRAPH 410

REVERSE DESTINATION ARRAY 430

| CHUNK | VERTEX POSITION | TARGET VERTEX | OLD VALUE | | | | LAST VALUE | NEW VALUE | CHUNK OFFSET | REVERSE EDGE POSITION |
|---|---|---|---|---|---|---|---|---|---|---|
| | | | T1 | T2 | T3 | T4 | | | | |
| B1 | 0 | E | | | | | | | 0 | 0+0 = 0 |
| | 1 | F | 1 A1 | 2 A2 | 1 A2 | | 1+3 = 4 | 0 | | 1+0 = 1 |
| B2 | 2 | G | | | | | | | 4 | 0+4 = 4 |
| | 3 | H | 1 A2 | | 3 A1 | | 0+2 = 2 | 0+1 = 1 | | 0+4 = 4 |
| B3 | 4 | I | | | | 2 A1 | | 0+0 = 0 | 2+4 = 6 | 0+6 = 6 |
| | 5 | J | | | | | 0+0 = 0 | 0+0 = 0 | | 0+6 = 6 |
| | | | | | | | | TOTAL EDGE COUNT | | 6 |

FORWARD DESTINATION ARRAY 420

| CHUNK | FORWARD EDGE POSITION | EDGE | TARGET VERTEX | VERTEX POSITION |
|---|---|---|---|---|
| A1 | 0 | N | F | 1 |
| | 1 | O | F | 1 |
| | 2 | P | H | 3 |
| | 3 | Q | H | 3 |
| A2 | 4 | S | F | 1 |
| | 5 | T | E | 0 |

REVERSE SOURCE ARRAY 440

| CHUNK | REVERSE EDGE POSITION | FORWARD EDGE POSITION | EDGE | SOURCE VERTEX | VERTEX POSITION |
|---|---|---|---|---|---|
| C1 | 0+0 = 0 | 5 | T | F | 1 |
| | 1+0 = 1 | 0 | N | E | 0 |
| | 1+1 = 2 | 1 | O | G | 2 |
| | 1+2 = 3 | 4 | S | G | 2 |
| C2 | 4+0 = 4 | 2 | P | G | 2 |
| | 4+1 = 5 | 3 | Q | I | 4 |

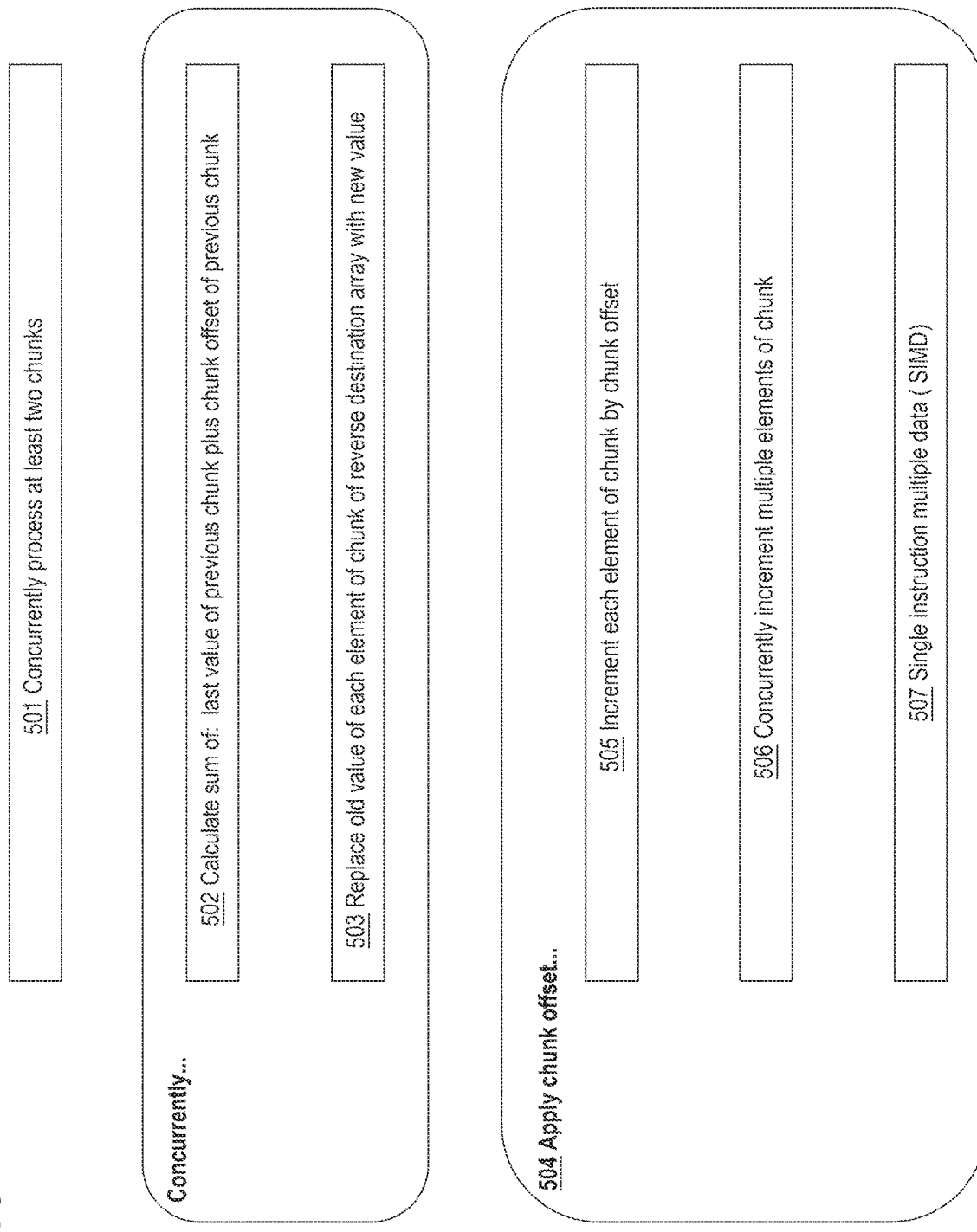

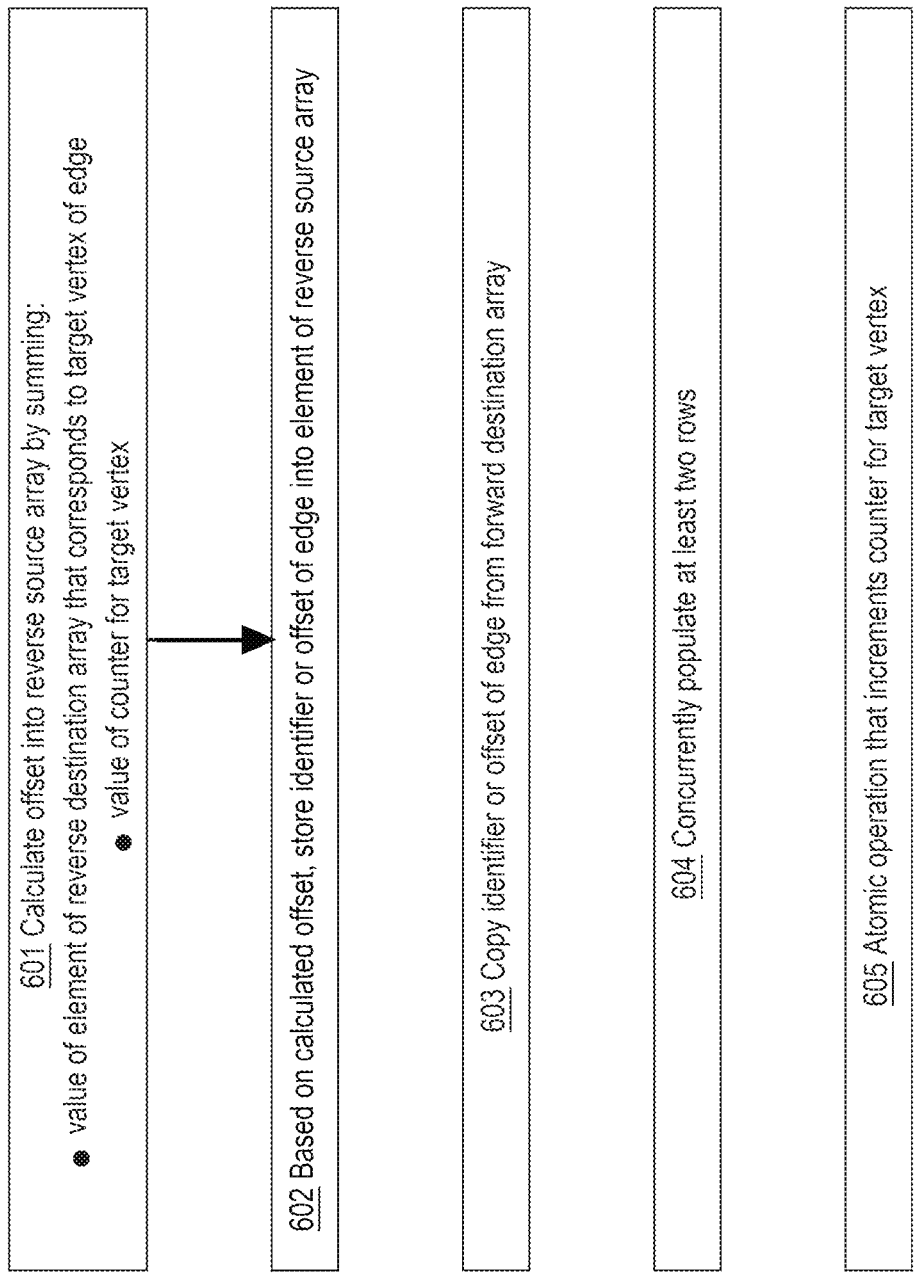

FAST IN-MEMORY TECHNIQUE TO BUILD A REVERSE CSR GRAPH INDEX IN AN RDBMS

RELATED CASE

Incorporated herein in its entirety is U.S. patent application Ser. No. 16/747,827 "PARALLEL AND EFFICIENT TECHNIQUE FOR BUILDING AND MAINTAINING A MAIN-MEMORY, CSR-BASED GRAPH INDEX IN AN RDBMS" filed by Marco Arnaboldi et al. on Jan. 21, 2020.

FIELD OF THE INVENTION

The present invention relates to loading a heterogeneous graph into memory from tables of a relational database. Herein are parallelism techniques to accelerate construction of pairs of redundant compressed sparse row (CSR) encodings for traversing directed edges of a property graph in either direction.

BACKGROUND

Demand is growing for graph analytics on data that resides in relational database management systems (RDBMS). Some solutions entail constructing graphs outside of the RDBMS storing the data of interest. One solution entails constructing graphs in a dedicated graph analytics engine. Another solution entails migrating data to a graph database. These solutions are undesirable because they substantially increase the complexity of data management in an enterprise and lead to significant loading/data transfer costs to external engines.

In an RDBMS, performance of graph analytics (such as graph pattern match querying, or graph algorithms execution, or a combination of both) directly upon relational tables is notably worse than performance offered by dedicated graph engines, especially for interesting algorithms such as PageRank. An RDBMS may fulfil a graph algorithm as a succession of table joins that are slow and require burdensome materialization of short lived intermediate results.

Some queries such as path-finding queries are better expressed as a graph query than a relational query such as structured query language (SQL). For example, a topological query may be better expressed as a regular expression or a context-free expression, which are not readily expressed as SQL. An RDBMS that expects only queries that are SQL and/or tabular typically does not have data structures that are dedicated to graph analytics. In these ways, a state of the art RDBMS may be too slow for graph analytics.

RDBMSs process relational data, i.e., data stored as tables that are connected together through Primary Key-Foreign Key relationships. Such relational data can be analyzed as a graph. For example, N:M relationships can be interpreted as edges. In-memory graph representations such as adjacency lists or adjacency matrices can then be built on top of the relational data.

One in-memory graph indexing approach is the Compressed Sparse Row (CSR) representation that provides a compact representation of an adjacency list that uses only two arrays, known herein as a source array and a destination array. A technical problem for directed graphs is that the CSR representation only makes it possible to follow edges in one direction: from the source array to the destination array, which may perform suboptimally for various graph analyses.

BRIEF DESCRIPTION OF THE DRAWINGS

In the drawings:

FIG. 1B is a block diagram that depicts an example forward CSR and reverse CSR;

FIG. 2 is a flow diagram that depicts an example process for populating a pair of CSRs for an edge type of a graph;

FIG. 4 is a block diagram that depicts an example computer that uses parallelism to accelerate population of pairs of CSR encodings of a graph;

FIG. 5 depicts example activities that facilitate parallel population of data and/or metadata of a reverse destination array;

FIG. 6 depicts example activities that facilitate parallel population of data and/or metadata of a reverse source array;

DETAILED DESCRIPTION

Figure 1A:
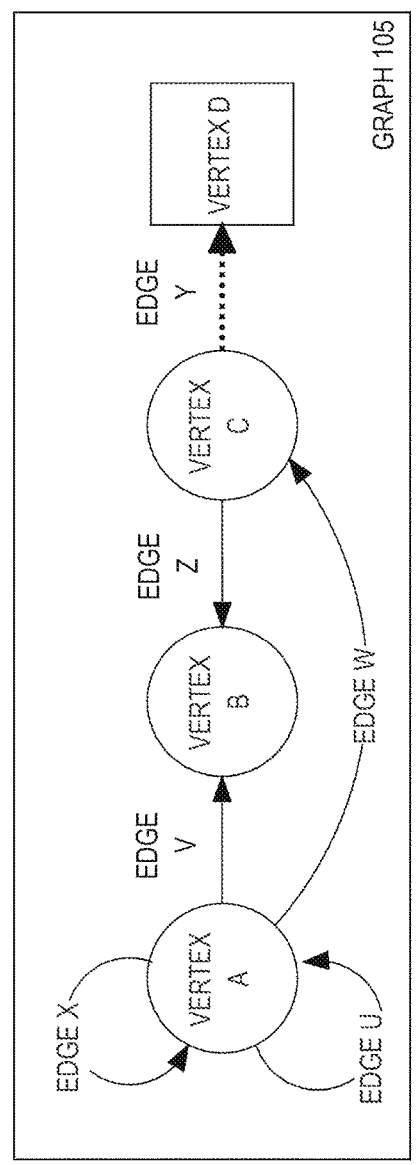
FIG. 1A is a block diagram that depicts an example mapping between an example relational schema and an example graph data model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are approaches for loading a heterogeneous graph into memory from tables of a relational database. Parallelism techniques are presented to accelerate construction of pairs of redundant compressed sparse row (CSR) encodings for traversing directed edges of a property graph in either direction.

Forward and reverse CSRs are in-memory relational database management system (RDBMS) graph indexes that, separately or together as a pair, make it possible to quickly follow edges from graph data in any direction and accelerate some graph pattern matching queries and graph algorithms such as PageRank. Like forward CSRs, reverse CSRs can be built from relational data using SQL queries but doing so is slow. Techniques herein make it possible to speed up the creation of a reverse CSR by building it from a preexisting forward CSR using a fast in-memory, parallel algorithm.

In addition to the forward CSR, it can be beneficial to build a second graph index, known herein as a reverse CSR, which stores all edges of the graph again, except with their direction reversed. The advantage of building a reverse CSR in addition to a forward CSR is that it makes it possible to follow edges in either direction, which can be beneficial both for graph pattern matching queries and graph algorithms. In one example, a user wants to match a long chain of vertices (a1)→(a2)→ . . . →(aN), with a very selective filter on vertex (aN)'s properties. If the forward CSR is the only graph index available, many chains will have to be explored all the way to (aN) before being discarded. If a reverse CSR is available, exploration can start from (aN), and the chain will only be followed in the rare cases (aN) was not filtered out, which is beneficial for performance.

In another example, the user wants to run the PageRank graph algorithm as explained later herein, using multiple threads. If there is no reverse CSR available, then multiple threads will iterate over different parts of the source array of the forward CSR, each time increasing the rank of neighbor vertices found in the destination array. Since multiple source vertices that are processed by different threads can be connected to the same destination vertex, the threads require synchronization to update the new rank of the destination vertex. If a reverse CSR is available, however, multiple threads can iterate over different destination vertices, each time finding all corresponding source vertices and computing the new rank immediately, without needing synchronization. Removing the need for synchronization across threads can increase throughput and reduce latency.

Using both a forward and a reverse CSR has two main drawbacks: (1) memory usage is doubled over using only a forward CSR and (2) building two graph indexes is slower than building a single graph index. Techniques herein reduce the impact of (2) by proposing a fast in-memory and parallel algorithm to build a reverse CSR from an pre-existing forward CSR, instead of building it from scratch using SQL queries over the vertex and edge tables.

In an embodiment, a computer obtains a mapping of a relational schema of a database to a graph data model. The relational schema identifies vertex table(s) that correspond to respective vertex type(s) in the graph data model and edge table(s) that correspond to respective edge type(s) in the graph data model. Each edge type is directed and thus associated with a respective source vertex type and a respective target vertex type. Based on that mapping, a forward compressed sparse row (CSR) representation is populated for forward traversal of edges of a same edge type. Each edge of the edge type originates at a source vertex of the source vertex type of the edge type and terminates at a target vertex of the target vertex type of the edge type. Based on the forward CSR representation, a reverse CSR representation of the edge type is populated for reverse traversal of the edges of the edge type. Acceleration occurs in two ways. First, values calculated for the forward CSR are reused for the reverse CSR. Second, elastic and inelastic scaling may occur in respective ways.

1.0 Example Computer and Graph

FIGS. 1A-B are block diagrams that both depict an example computer 100 and example graph 105, in an embodiment. Computer 100 uses parallelism to accelerate population of pairs of redundant compressed sparse row (CSR) encodings of logical graph 105. Computer 100 may be at least one rack server such as a blade, a personal computer, a mainframe, a virtual computer, or other computing device. When computer 100 comprises multiple computers, the computers are interconnected by a communication network.

Graph 105 is a directed graph that contains vertices A-D and directed edges U-Z that interconnect vertices A-D as shown. Graph 105 is an instance of graph data model 130 that contains vertex types 141-142 and edge types 151-152, as shown in the element type column of graph data model 130. The display column of graph data model 130 is a demonstrative legend for graph instances such as 105. For example and according to the display column, edge Y is shown as a dotted line that indicates that edge Y is an instance of edge type 152

FIG. 1A depicts an example mapping 120 between an example relational schema 160 and an example graph data model 130, in an embodiment. Graph data model 130 may define properties (not shown) and types of vertices and edges. For example, vertex type 141 may have an age property and a color property, some, none, or all of which may also be properties of vertex type 142.

According to graph data model 130, each edge type has a respective source vertex type and target vertex type, either, none, or both of which may be identical for other edge types. For example, both edge types 151-152 have a same source vertex type 141, but different respective target vertex types 141-142.

For edge type 151, the source vertex type is also the target vertex type, which facilitates self-directed edges, such as X, that originate and terminate at a same vertex. In some embodiments, a first vertex may be redundantly connected in a same direction or opposite directions to a same second vertex by multiple edges of a same or different edge type. For example, edges U and X redundantly connect vertex A to itself.

In operation and depending on embodiment, graph 105 is loaded for analytics into volatile or non-volatile memory as various columnar vectors. The contents of a vector are homogeneous as to element data type, although different vectors may have different content data types. For example, a vector may store values of a same property of vertices or edges of a same type. A vector may store a system property of a graph element, such as identifiers of vertices of vertex type 141. A vector may store an application property of a graph element, such as shipping status of vertices of vertex type 141.

Although elements of a same vector are stored contiguously in memory, multiple vectors of different respective properties of a same graph element type need not be adjacent in memory. Multiple vectors of different respective properties of a same graph element type should have a same amount of elements, and contents of those vectors should be identically ordered. For example for vertex type 141, a color or age of vertex A should occur at a same offset in each of respective color and age property vectors.

That offset may operate as a canonical offset to access all properties of a same vertex or edge. A canonical offset may also be known herein as an internal identifier, a volatile identifier, or an in-memory graph topology identifier (IM-GTID). As explained later herein, a canonical offset is one of various kinds of dense identifier.

As used herein, an in-memory array for one graph element type may, depending on the context, be a single property vector or a logical aggregation of multiple different property vectors that accept a canonical offset of the graph element type as an offset. Each graph element type has its own zero-based increasing sequence of canonical offset values. Computer 100 is careful not to confuse canonical offset values of different graph element types, even though such offsets are syntactically interchangeable. Canonical offsets are not semantically interchangeable.

A canonical offset uniquely identifies a vertex or edge within its vertex type or edge type. A canonical offset is not globally unique. Vertices and/or edges of different types may unintentionally share a same canonical offset. For example, zero may be the same canonical offset of both vertex A and D that have different vertex types.

In an embodiment, uniqueness of a canonical offset is guaranteed only for a same graph instance. If graph data model 130 describes multiple graph instances that concurrently reside in memory, then each graph instance has its own set of vertex arrays and edge arrays. For example and regardless of whether or not two graph instances share same graph data model 130, if the two graph instances share vertex type 141, then there are two separate vertex arrays with separate property vectors for same vertex type 141. Thus, canonical offsets of vertices of same vertex type 141 for two graph instances should not be confused.

In an embodiment, graph instances may partially overlap to share vertex(s) and/or edge(s). Even for graph instances that do not share metadata 120, 130, and/or 160, graph instances may share some CSRs, vectors, or arrays when vertex type(s) and/or edge type(s) are shared. For example, such aggregation and/or index structures may store a union of both graph instances for one, some, or all graph element types. In an embodiment, only metadata 120, 130, and/or 160 may be shared, but graph instance content is not shared. CSRs are explained later herein.

Loading any or every graph element type into memory may create at least one property vector per graph element type. Thus, every vertex type and edge type has a non-empty logical set of property vectors. For a vertex type, that logical set of vectors is known herein as a vertex array, which is logically tabular. For an edge type, that logical set of vectors is known as an edge array, which is logically tabular.

Thus, vertex types 141-142 and edge types 151-152 each has a respective vertex array or edge array of property vectors. Herein, all internal identifiers of graph elements in memory are canonical offset values into a vertex array or edge array of a respective graph element type. Every graph element type has its own zero-based, dense, ascending, and continuous sequence of non-negative integer values that is valid while graph 105 is loaded in memory and until graph 105 is evicted from memory and/or reloaded into memory as explained in related U.S. patent application Ser. No. 16/747,827.

Some property vector(s) in one graph element type's array may store canonical offsets of another graph element type for cross referencing. For example, an edge array may have a property vector that stores canonical offsets of vertices of the target vertex type of the edge type. Thus, various graph element arrays may be related to each other, which is sufficient to encode the entire topology of graph 105.

Graph 105 is loaded from a relational database having relational schema 160 that defines vertex tables 171-172 and edge tables 181-182. Relational schema 160 defines the persistence format of data for graph 105, and graph data model 130 defines an analytical format that is suitable for graph analytics in memory. For example, each row of vertex table 171 may be a persistent representation of a respective vertex of vertex type 141. For example, vertex A may be stored as a row in vertex table 171, and vertex D may be stored in vertex table 172.

Mapping 120 is more or less a data binding between graph data model 130 and relational schema 160. Mapping 120 may be bi-directional to facilitate data reformatting during loading or persisting. In an embodiment, rows of mapping 120 are stored as rows in a mapping table, such as in relational schema 160 or in a different schema and/or database. In an embodiment, mapping 120 is instead persisted to a separate data file or interactively entered during operation.

Although not shown, mapping 120 may contain finer or coarser grained bindings than a one-to-one mapping of tables to vertex types. For example, mapping 120 may contain a query predicate that can selectively bind rows of a vertex table to different respective vertex types based on content of vertex table rows. Likewise, mapping 120 may contain a query union or query join that can bind a vertex type to multiple vertex tables.

Semantics of mappings, such as 120, provide flexibility to facilitate various scenarios. For example, multiple database instances may share a same relational schema 160 but have different content per database instance in the relational tables, and a same graph data model 130 and mapping 120 may be used to generate a separate graph instance for each of the database instances. Different mappings, such as 120, may each map a same relational schema 160 to different respective graph data models. Different mappings, such as 120, may each map different respective relational schemas to a same graph data model.

Mapping 120 provides flexibility for various structural normalization, renormalization, or denormalization scenarios. For example, each vertex table row may map to a vertex, and each edge table row may map to an edge. An edge table may have a foreign key to a vertex table, or vice versa. Those and the following mapping details, such as which table columns are primary or foreign keys and how those keys are used and associated with graph element types, are specified in mapping 120.

Polarity of table relationships may vary in some embodiments as follows. For example, an edge table, which connects two vertex tables, may have a foreign key of one vertex table, and the other vertex table may have a foreign key of the edge table. The edge table may be an associative table that has two foreign keys respectively for both connected vertex tables. An edge table may have no foreign keys, such as when both connected tables have the foreign key of the edge table. An edge type need not have any edge table, such as when one vertex table has a foreign key of another vertex table.

There may be some overloading of a table row such that mapping 120 may map a same row of a same vertex table to multiple vertex types. For example, the same row may have two columns with different respective foreign keys for different respective relationships that map to different respective edge types that have different respective source vertex types and/or different respective target vertex types.

Various embodiments of mapping 120 may contain various kinds of binding tuples such as any of:
  (relational table, graph element type)
  (source vertex type, edge type, target vertex type)
  (source vertex table, edge table, target vertex table)
  (source primary key, source foreign key, target primary key, target foreign key).
An embodiment may partially or entirely combine those kinds of tuples to achieve other kinds of tuples instead.

In the many ways presented above there is ample flexibility such that mapping 120 may be reused with different database instances, such as a January sales database and a February sales database, and different mappings can: a) adapt different respective relational schemas to a same graph data model, and/or b) adapt different respective graph data models to a same relational schema. For example two different mappings may alternatively map a same edge table to different respective edge types that differ only in direction in different respective graph data models. For example, both edge types may connect a same two vertex types such that one edge type uses one vertex type as a source vertex type, and the other edge type instead uses the same vertex type as a target vertex type. Thus, foreign key polarity and edge type direction may or may not be related.

Such adaptabilies may facilitate integration with a legacy database without disturbing its legacy schema and thereby future-proofing the legacy schema and legacy content. Thus, reuse and/or repurposing of mappings, relational schemas, graph data models, and/or database content is facilitated.

1.1 Example Forward CSR

FIG. 1B depicts example forward CSR 110 and reverse CSR 115, in an embodiment. FIG. 1B is presented with reference to FIG. 1A.

Mapping 120 of FIG. 1A is metadata that need not provide actual content of any particular graph instance such as 105 for analytics. The analytic representation of graph 105 is based on CSR aggregation(s), such as 110 and/or 115, for topological encoding in memory such as volatile dynamic random access memory (DRAM). As shown, CSRs 110 and 115 encode only edges of edge type 151. Other edge types may each have a separate pair of CSRs.

Forward CSR 110 contains forward arrays 190 and 195 that, although shown as tabular, are integer vectors of a respective single column whose actually stored content is shown as bold. Columns in forward CSR 110 that are not shown as bold are implied columns that may be demonstrative and not actually stored.

Vertices and edges of graph 105 are topologically encoded into pair(s) of CSRs, such as 110 and 115 for edge type 151, as follows. Each edge type has its own forward CSR that has its own forward source array, such as 190. Each row of forward source array 190 represents a distinct vertex of vertex type 141 that is the source vertex type of edge type 151. Each edge type has its own edge array, such as forward destination array 195 for edge type 151. Each row of forward destination array 195 represents a distinct edge of edge type 151.

Each edge type has its own CSR pair, such as CSRs 110 and 115 for edge type 151. Although multiple edge types 151-152 share a same source vertex type 141, respective forward CSRs of edge types 151-152 have their own respective forward source arrays.

Forward source array 190 contains a forward edge position vector that contains offsets of rows of forward destination array 195. Values in the forward edge position vector of forward source array 190 are monotonically increasing to indicate a starting position of a subsequence of rows of forward destination array 195 that represent edges of edge type 151 that originate from the vertex of a given row of forward source array 190. For example in forward source array 190, vertex A originates edges of edge type 151 that are represented as contiguous respective rows starting at row 0 of forward destination array 195. Each value in the forward edge position vector of forward source array 190 may be calculated by adding, to the previous value, a count of edges of edge type 151 that originate from the previous vertex of the previous row of forward source array 190.

For example, vertex A originates four edges U-X of edge type 151, which are represented by rows 0-3 of forward destination array 195. Thus, zero+four=four is the value in the forward edge position vector of forward source array 190 for vertex B. Likewise, vertex B originates no edges, and thus four+zero=four is the value in the forward edge position vector of forward source array 190 for vertex C. In an embodiment, a last entry in the forward edge position vector of forward source array 190 contains a count of edges of edge type 151, which also is a count of rows in forward destination array 195.

Each edge row of forward destination array 195 indicates, in the vertex position vector, an offset of a row in a vertex array of target vertex type 141, which in this case may be or include forward source array 190 as explained below. For example, the vertex position vector of forward destination array 195 indicates that edge V terminates at the vertex in row 1 of forward source array 190, which is vertex B.

By using only the forward edge position vector of forward source array 190, computer 100 can detect that vertex A originates four edges of edge type 151 by subtracting adjacent values. By using forward destination array 195 after using forward source array 190, computer 100 can further detect that those four edges terminate at vertices A-C. With a separate CSR for each edge type, the entire topology of graph 105 may be densely encoded and rapidly traversed.

Arrays 190 and 195 are both shown as having both vertex position and forward edge position columns or vectors. All of those columns/vectors contain canonical offsets of graph elements that, for a given column or vector, are for a single graph element type. In forward source array 190, the vertex position column contains canonical offsets for vertex type 141, and the forward edge position vector contains canonical offsets for edge type 151.

In forward destination array 195, the forward edge position column contains canonical offsets for edge type 151, and the vertex position vector contains canonical offsets for vertex type 141. The forward edge position vector and column of respective arrays 190 and 195 in same CSR 110 should be for a same edge type. The vertex position column and vector of respective arrays 190 and 195 in same CSR 110 may or may not be for a same vertex type, depending on whether or not the source vertex type and target vertex type of edge type 151 are identical.

Although arrays 190 and 195 are shown as contents of forward CSR 110, those arrays may also logically be vertical slices of graph element arrays in some embodiments. For example in an embodiment, forward source array 190 may be a subset of columns of the vertex array for vertex type 141. In any case, forward source array 190 and the vertex array for vertex type 141 have a same amount and ordering of vertices.

Edge types 151-152 have separate CSRs with separate source arrays with separate forward edge position vectors even though edge types 151-152 both have same source vertex type 141. In an embodiment, those separate forward edge position vectors may also be separate columns in a same vertex array for vertex type 141.

In an embodiment, forward destination array 195 may be a subset of columns of the edge array for edge type 151, in which case forward destination array 195 and the edge array for edge type 151 have a same ordering of edges. In another embodiment, forward destination array 195 and the edge array for edge type 151 may have a different ordering of edges, so long as there is a mapping between those orderings as explained later herein. In any case, forward destination array 195 and the edge array for edge type 151 have a same amount of edges.

1.2 Example Reverse CSR

CSRs 110 and 115 are a pair that facilitate bidirectional traversal of edges of unidirectional edge type 151. Edge traversal in the edge direction uses forward CSR 110. Edge traversal against the edge direction uses reverse CSR 115.

Thus, edge traversal in either direction may occur in more or less similar amounts of time and space.

Although CSRs 110 and 115 are for traversals of opposing directions, this is not the same as two distinct edge types connecting a same two vertex types but in opposite directions. For example, there may be a pair of CSRs for edge type 152 that originates at vertex type 141 and terminates at vertex type 142. Another edge type that instead originates at vertex type 142 and terminates at vertex type 141 would have a separate pair of CSRs. Even when two edge types have the same source vertex type and target vertex type, those two edge types would have a separate pair of CSRs.

CSRs 110 and 115 are a redundant pair because both CSRs encode a same topological portion of graph 105 in alternate ways, either or both of which may be used during a same traversal of graph 105. For example, a query for routes in a city of one-way streets may entail two concurrent searches respectively from an origin and a destination and succeed when both searches have reached any same intermediate vertex. In an embodiment, CSRs 110 and 115 are both used to treat directed graph 105 as an undirected graph. An example that need use only reverse CSR 115 is the PageRank algorithm that may measure importance of a webpage by traversing hyperlinks backwards to referring webpages to discover a transitive closure surrounding the measured webpage.

Reverse CSR 115 contains reverse arrays 117 and 119 that, although shown as tabular, are integer vectors of a respective single column whose actually stored content is shown as bold. Columns in reverse CSR 115 that are not shown as bold are implied columns that may be demonstrative and not actually stored.

Vertices and edges of graph 105 are topologically encoded into a reverse CSR, such as 115 for edge type 151, as follows. Each edge type has its own reverse CSR that has its own reverse destination array, such as 117. Each row of reverse destination array 117 represents a distinct vertex of vertex type 141 that is the target vertex type of edge type 151. Each row of reverse source array 119 represents a distinct edge of edge type 151.

Each edge type has its own CSR pair, such as CSRs 110 and 115 for edge type 151. Although multiple edge types 151-152 share a same target vertex type 141, respective reverse CSRs of edge types 151-152 have their own respective reverse source arrays.

Reverse destination array 117 contains a reverse edge position vector that contains offsets of rows of reverse source array 119. Values in the reverse edge position vector of reverse destination array 117 are monotonically increasing to indicate a starting position of a subsequence of rows of reverse source array 119 that represent edges of edge type 151 that terminate at the vertex of a given row of reverse destination array 117. For example in reverse destination array 117, vertex A terminates edges of edge type 151 that are represented as contiguous respective rows starting at row 0 of reverse source array 119. Each value in the reverse edge position vector of reverse destination array 117 may be calculated by adding, to the previous value, a count of edges of edge type 151 that terminate at the previous vertex of the previous row of reverse destination array 117.

For example, vertex A terminates two edges U and X of edge type 151, which are represented by rows 0-1 of reverse source array 119. Thus, zero+two=two is the value in the reverse edge position vector of reverse destination array 117 for vertex B. Likewise, vertex B terminates two edges V and Z, and thus two+two=four is the value in the reverse edge position vector of reverse destination array 117 for vertex C.

In an embodiment, a last entry in the reverse edge position vector of reverse destination array 117 contains a count of edges of edge type 151, which also is a count of rows in reverse source array 119.

Each edge row of reverse source array 119 indicates, in the vertex position vector, an offset of a row in a vertex array of source vertex type 141, which in this case may be or include reverse destination array 117 as explained below. For example, the vertex position vector of reverse source array 119 indicates that edge Z originates at the vertex in row 2 of reverse destination array 117, which is vertex C.

By using only the reverse edge position vector of reverse destination array 117, computer 100 can detect that vertex B terminates two edges of edge type 151 by subtracting adjacent values, such as subtracting the value for vertex A from the value for vertex B, which yields 2−0=two. By using reverse source array 119 after using reverse destination array 117, computer 100 can further detect that those two edges originate at vertices A and C. With a separate reverse CSR for each edge type, the entire topology of graph 105 may be densely encoded and rapidly traversed backwards.

Reverse arrays 117 and 119 are both shown as having both vertex position and reverse edge position columns or vectors. All of those columns/vectors contain canonical offsets of graph elements that, for a given column or vector, are for a single graph element type. In reverse destination array 117, the vertex position column contains canonical offsets for vertex type 141, and the reverse edge position vector contains canonical offsets for edge type 151.

In reverse source array 119, the reverse edge position column contains canonical offsets for edge type 151, and the vertex position vector contains canonical offsets for vertex type 141. The reverse edge position vector and column of respective reverse arrays 117 and 119 in same reverse CSR 115 should be for a same edge type. The vertex position column and vector of respective reverse arrays 117 and 119 in same reverse CSR 115 may or may not be for a same vertex type, depending on whether or not the source vertex type and target vertex type of edge type 151 are identical.

Although reverse arrays 117 and 119 are shown as contents of reverse CSR 115, those reverse arrays may also logically be vertical slices of graph element arrays in some embodiments. For example in an embodiment, reverse destination array 117 may be a subset of columns of the vertex array for vertex type 141. In any case, reverse destination array 117 and the vertex array for vertex type 141 have a same amount and ordering of vertices.

Two edge types have separate CSRs with separate reverse destination arrays with separate reverse edge position vectors even though both edge types have a same target vertex type. In an embodiment, those separate reverse edge position vectors may also be separate columns in a same vertex array for the target vertex type.

The forward edge position vector of reverse source array 119 stores, for each edge, an offset of the edge within forward destination array 195 and/or the edge array for edge type 151. In an embodiment, reverse source array 119 and the edge array for edge type 151 may have a different ordering of edges, so long as there is a mapping between those orderings. For example, the forward and reverse edge position columns of reverse source array 119 may operate as a bidirectional lookup table to translate edge positions. In any case, reverse source array 119 and the edge array for edge type 151 have a same amount of edges.

Presented herein are techniques for populating entries of a same reverse CSR and/or a same CSR pair in parallel for acceleration in shared memory, such as by symmetric multiprocessing (SMP) such as with a multicore processor. For example, graph 105 may be huge such as having billions of vertices, trillions of edges, and/or a diameter of tens or hundreds of thousands of vertices. For example, temporal feasibility may depend on horizontally scaled populating of a same reverse CSR according to synchronization and coordination techniques herein.

In an embodiment, memory structures such as CSRs and vertex tables are optional. The following data definition language (DDL) statement may designate my_graph 105 as eligible for loading into memory, where owner is a user or schema.

ALTER PROPERTY GRAPH [owner.]my_graph INMEMORY

A similar DDL statement may designate graph 105 as no longer eligible for memory loading. In an embodiment and as discussed later herein, computer 100 exposes graph 105 to clients in a same way, regardless of whether or not graph 105 resides in memory. For example if graph 105 does not reside in memory, then computer 100 may apply data manipulation language (DML) statements such as structured query language (SQL) to a database that contains relational schema 160 and its tables to, on the fly, perform filtration, joins, and projection as needed to retrieve a result set that represents graph 105 or a particular graph data element or all instances of a particular graph data element type.

Also as described later herein, loading some or all of graph 105 into memory may asynchronously occur in a background process such that: a) a client request is more or less entirely delegated for query processing to a database management system (DBMS) that is hosted by computer 100 or a different computer, b) but a repetition of the same request is instead solely applied to graph 105 in memory during the same graph analysis session. Various embodiments may incorporate some or all of computer 100's graph processing functionality into the DBMS itself. For example, the DBMS on computer 100 may operate as both a relational database engine and a graph database engine.

Also as described later herein, graph 105 may be loaded and/or unloaded to/from memory in a piecemeal way that is synchronous to a client request or asynchronous such as in the background. For example, CSRs and/or vertex tables are individually loaded into memory as driven by demand and individually evicted from memory as driven by memory scarcity. In another example as described later herein: a) horizontal and/or vertical slices of vertex tables and/or edge tables have their data stored into memory chunks; b) each chunk may be individually loaded or, in an embodiment, individually evicted; and c) multiple chunks may load in parallel from same or different relational table(s). Thus, fulfilment of a client request may entail a mix of accessing database tables and memory.

2.0 CSR Pair Population Process

FIG. 2 is a flow diagram that depicts an example process that computer 100 may perform for populating a pair of CSRs 110 and 115 for edge type 151 of graph 105. FIG. 2 is discussed with reference to FIGS. 1A-B. Parallel population of reverse CSR 115 is presented later herein. Parallel population of forward CSR 110 is presented in related U.S. patent application Ser. No. 16/747,827.

Step 202 obtains, as presented earlier herein, mapping 120 that binds relational schema 160 to graph data model 130. For example, mapping 120 may comprise a lookup table whose keys are relational table names and whose values are vertex type names. Mapping 120 may specify source and target vertex types for each edge type. Mapping 120 may be manually composed or automatically derived such as by analyzing graph data model 130 and relational schema 160.

A separate CSR pair may be generated for each edge type 151-152 of graph data model 130. Steps 204 and 206 populate a CSR pair for one edge type and may be repeated for additional edge types of same graph data model 130.

Based on mapping 120, step 204 populates forward CSR 110 as described elsewhere herein and/or in related U.S. patent application Ser. No. 16/747,827. After step 204, forward CSR 110 is ready to use.

Based on forward CSR representation 110, step 206 populates reverse CSR representation 115 as described elsewhere herein. Parallelization of step 206 is presented later herein. After step 206, reverse CSR 115 is ready to use.

Consulting forward CSR 110 accelerates step 206 by reusing work already done during step 204. Consulting CSR representation 110 accelerates step 206 by avoiding redundant work such as counting, grouping, or sorting vertices and/or edges and/or input/output (I/O) such as accessing persistent storage. Other techniques for populating a CSR do not consult another CSR.

3.0 Example Performance Improvements

Figure 3:
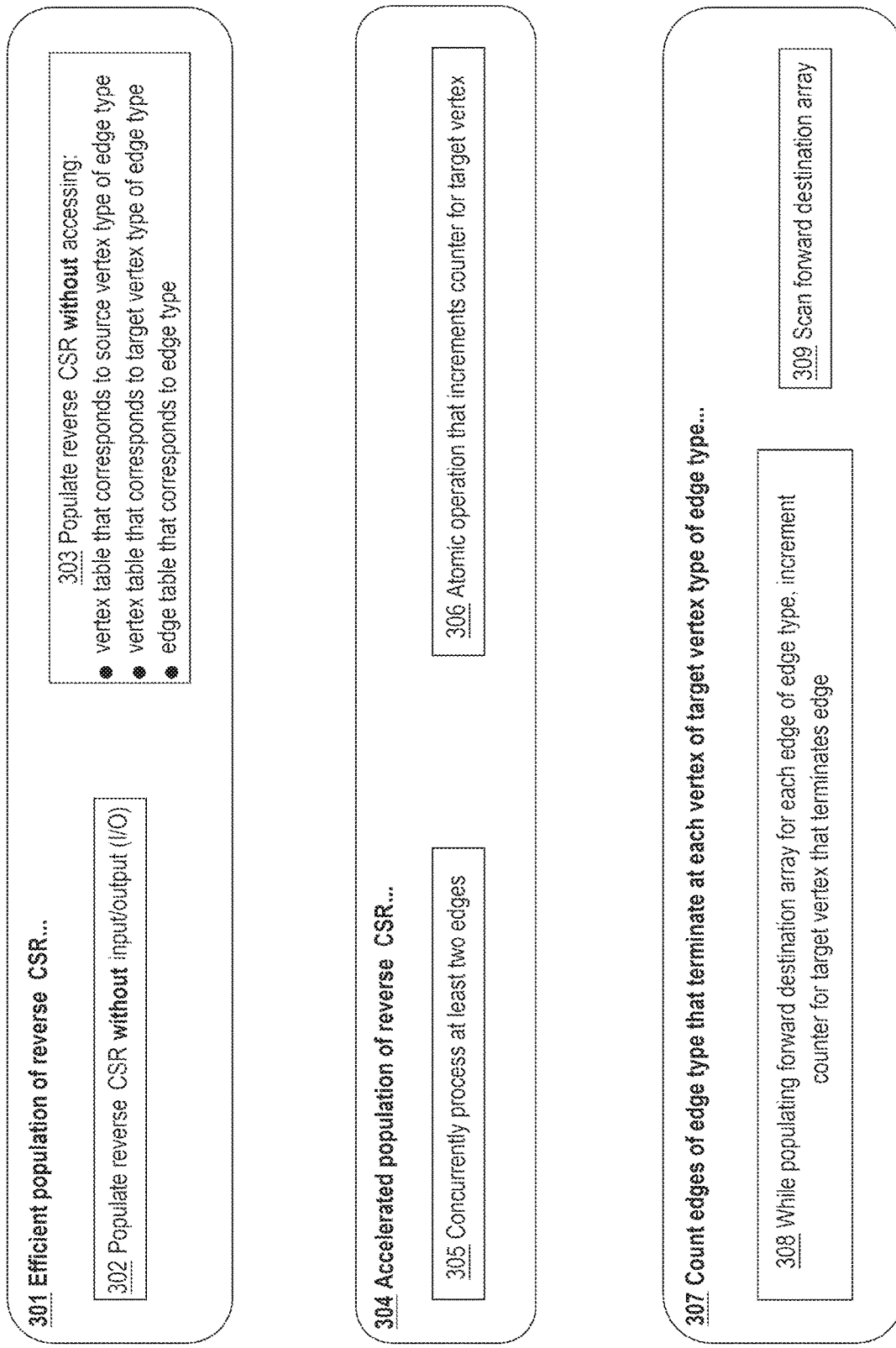
FIG. 3 depicts example activities that may occur to populate a reverse CSR.

FIG. 3 depicts example activities that may occur to populate reverse CSR 115. FIG. 3 is discussed with reference to FIGS. 1A-B and 2. In an embodiment, forward CSR 110 is populated before some activities of FIG. 3 occur. In an embodiment, population of forward CSR 110 is pipelined or otherwise somewhat concurrent to some activities of FIG. 3.

Embodiments may perform some or all of activities 301-309 in any order. Activities 301-309 present design choices that are not mutually exclusive and may or may not be optional. Most of activities 301-309 may be combined.

Activity 301 efficiently populates reverse CSR 115. Activities 302-303 are prohibitions on some high latency activities. In other words, activities 302-303 specify operations that do not occur while populating reverse CSR 115.

Activity 302 populates reverse CSR 115 without performing input/output (I/O). In other words, activity 302 has all needed data already available in random access memory (RAM) such as volatile RAM. For example, forward CSR 110 may already reside in memory and may be consulted by activity 302.

Activity 303 populates reverse CSR 115 without accessing relational tables that provide vertices and edges for edge type 151. For example, activity 303 need not access any relational tables nor anything persisted in a database, unless the edge type is used as a leaf edge as explained later herein. Especially, activity 303 does not access any of: source vertex table 171, a target vertex table (also 171 in this example), nor edge table 181. For example, activity 303 may instead access needed data in forward CSR 110 in memory.

Activity 304 uses parallelism to accelerate population of reverse CSR 115 such as by horizontal scaling with multiple computational threads, CPUs, and/or CPU cores. For example, population of some row(s) in reverse array(s) 117 and/or 119 may be assigned to a different thread. Work distribution techniques such as data partitioning, a thread pool, a backlog, and thread safety are discussed later herein.

Activity 305 concurrently processes at least two edges. For example, two edges that originate or terminate at a same vertex may be processed by respective threads. For example, each row in reverse source array 119 may be populated by a respective thread.

Activity 306 performs an atomic operation that increments a counter for a target vertex. For example and as discussed later herein, each target vertex A-C of vertex type 141 may have its own respective counter that is accessed by an atomic instruction of an instruction set architecture (ISA). For example, fetch-and-add may atomically read and increment the counter. As discussed later herein, contention may cause simultaneous atomic instructions to be serially executed.

Activity 307 counts edges of edge type 151 that terminate at each vertex of target vertex type 141. For example, the reverse edge position vector in reverse CSR 115 may be populated based on such edge counts. Likewise, rows for edges in reverse source array 119 may be assigned to target vertices based on such edge counts.

Population of CSRs 110 and 115 may somewhat temporally overlap, especially when population of forward CSR 110 needs and/or calculates values that are also needed to populate reverse CSR 115. For example, synchronous logic or asynchronous pipeline parallelism may cause population of CSRs 110 and 115 to: a) somewhat concurrently occur, b) copy and/or reuse calculated values, and/or c) consult previously populated data partitions such as chunks as presented later herein.

While populating forward destination array 195 for each edge of edge type 151, activity 308 increments a respective counter for a target vertex that terminates the edge. For example because target vertex B terminates two edges V and Z, the counter for target vertex B should twice be incremented by one. Such edge counters and thread safety are discussed later herein.

Forward destination array 195 may provide any or all edges of edge type 151. Activity 308 may have or facilitate parallelism that avoids linear processing (i.e. iterating) of edges such as within forward destination array 195. Activity 309 is a single threaded embodiment that counts edges per target vertex by linearly iterating forward destination array 195 or other edge array for edge type 151. Activities 308-309 may be somewhat mutually exclusive. However as presented later herein, data chunking may facilitate multithreading that concurrently counts edges in different chunks, but sequentially processes edges within a same chunk.

4.0 Parallel Population of Reverse Destination Array

FIG. 4 is a block diagram that depicts an example computer 400 and example graph 410, in an embodiment. Computer 400 uses parallelism to accelerate population of pairs of redundant compressed sparse row (CSR) encodings of logical graph 410. Computer 400 may be an implementation of computer 100.

FIG. 5 depicts example activities that facilitate parallel population of data and/or metadata of reverse destination array 430. An embodiment may implement some or all of activities 501-507 that may occur in any order. Some of activities 501-507 may be combined into one activity. As follows, FIGS. 4-5 demonstrate example configuration and operation of computer 400.

Example graph 410 has a graph data model that has only one vertex type and two edge types shown respectively as solid or dashed arrows. The solid edge type may be encoded into a CSR pair as follows, which excludes edge R that has a different edge type and belongs in a different CSR pair. Forward destination array 420 and a forward source array are encoded as described earlier herein.

Single program multiple data (SPMD) with shared memory and multiple asynchronous computational threads, CPUs, and/or CPU cores provides horizontal scaling that accelerates population of some or all of the arrays of the CSR pair as follows. In an embodiment, any array of the CSR pair may be logically and/or physically partitioned into multiple chunks that each have multiple adjacent rows of the array. For example, forward destination array 420 contains chunks A1-2 of three edges each.

To accelerate processing any array, each thread may simultaneously process a respective chunk of the array. If there are more chunks than threads, an ordered or unordered backlog may contain the unprocessed chunks. When a thread finishes a chunk, the thread may take and process another chunk from the backlog until the backlog is empty.

Two concurrent threads may respectively process chunks A1-A2, which may include populating and/or subsequently reading chunks A1-A2. For convenience, those threads are known herein according to their respective chunks. Thus, chunks A1-A2 are respectively processed by threads A1-A2 that concurrently populate reverse destination array 430 as follows and shown as activity 501.

Threads A1-A2 may operate in various phases and share data with other threads of other parallel or serial stages of a processing pipeline. The goal is to populate the reverse edge position vector of reverse destination array 430. To achieve this, the reverse edge position vector of reverse destination array 430 may temporarily store various intermediate values at various times such as old value and new value as shown.

In a first phase, threads A1-A2 concurrently calculate and adjust old value that is stored in the reverse edge position vector of reverse destination array 430. Although threads A1-A2 are concurrent together, each thread serially processes each edge of the thread's own chunk. That is, each thread processes one edge at a time, such as during each of times T1-T4.

Because the reverse edge position vector of reverse destination array 430 has an element for each vertex E-J, there is an old value for each element. Initially before T1, all old values are zero.

Times T1-T4 are logical and relative times that, although monotonically increasing, need not be equally spaced. For example, T1-2 may occur milliseconds apart, and T2-3 may occur nanoseconds apart.

At time T1, threads A1-A2 process a first edge of their respective chunks by: a) detecting, while populating or reading forward destination array 420, which is the target vertex of the first edge, and b) incrementing by one the old value of that target vertex. For example, the target vertex of the first edge of chunk A2 is vertex H whose vertex position is three. Thus, as shown for vertex H at time T1, 1 A2 means that thread A2 stores a one, which is the initial zero incremented by one. Thread A1 concurrently behaves similarly for its first edge N at time T1 shown as 1 A1.

Old value is a demonstrative alias for the reverse edge position vector of reverse destination array 430. Thus, values shown in old value at times T1-T4 are actually stored into the reverse edge position vector of reverse destination array 430 at those times.

At time T2, threads A1-A2 process their respective second edges O and S that both terminate at same target vertex F. Thus, threads A1-A2 simultaneously attempt to increment the old value of vertex F, which is an operational collision that entails racing that may potentially corrupt the old value of vertex F. Some embodiments do not support redundant edges such as O and S that both have a same source vertex and a same target vertex.

In a thread-safe embodiment, the old value is protected by an atomic instruction of a CPU's instruction set architecture (ISA). An atomic instruction such as fetch-and-add can atomically: read the value of a numeric variable, and increment the numeric variable. Threads A1-A2 use an atomic instruction to increment old value. In an embodiment, compare-and-swap is an atomic instruction that is used instead of fetch-and-add.

When atomic instructions for a same variable, such as an array element or memory address, are simultaneously issued by multiple threads, execution of the atomic instructions is serialized, such as along times T2-3 as shown. For example as shown, thread A2 increments the old value of vertex F at time T2, and thread A1 increments the old value of vertex F at time T3. Such serialization safely resolves the collision.

In other embodiments, other software synchronization mechanisms achieve thread safety such as mutual exclusion (mutex), semaphore, lock, or critical section. In any case, a collision could only occur at a same element of an array. Simultaneous access of different elements of a same array are inherently thread safe. For example, each element may have its own separate lock.

Due to atomic serialization or other factors, thread A2 races ahead and finishes its last edge at time T3 as shown. Whereas, thread A1 lags behind and finishes at time T4 as shown. This population phase continues for as long as it takes all participating threads to finish, which may be detected with a software synchronization mechanism such as a semaphore or barrier.

In an embodiment, reverse destination array 430 contains chunks B1-3 that each contains two target vertices. In the next population phase, threads B1-3 may process respective chunks B1-3. In an embodiment, threads A1-2 and B1-3 are overlapping sets of threads. For example, thread A1 and B3 may be a same thread that is repurposed. For example, a thread may return to a pool of idle threads upon finishing processing and wait to be repurposed.

Based on the final old values, each of threads B1-B3 iterates over the target vertices of the thread's respective chunk to calculate a running total of edges in the chunk that is stored, for each target vertex, into a respective element of new value. The new value of the first target vertex of each chunk is set to zero as shown. The new value of each subsequent target vertex in the chunk is the sum of the new value of the previous element in the chunk plus the final old value of the previous element.

For example for the second target vertex F of chunk B1, the new value of the previous target vertex E is zero, and the final old value of the previous target vertex E is one. Thus, thread B1 calculates new value for target vertex F as 0+1=one as shown and stores that. New value is a demonstrative alias for the reverse edge position vector of reverse destination array 430. Thus, values shown in new value are actually stored into the reverse edge position vector of reverse destination array 430, thereby overwriting the old values previously stored, shown as activity 503.

Each chunk B1-B3 may contain or otherwise be associated with its own metadata fields such as last value and chunk offset as shown. Each chunk may have its metadata calculated and stored by a respective thread. As explained above, old value is a count of edges for each target vertex, and new value is a running total of those counts within a chunk.

The new value for a target vertex does not include the old value edge count of the target vertex, but only includes the old value edge counts of the previous target vertices in the chunk. Thus, the old value edge count of the last target vertex in the chunk is excluded from new value. Despite that exclusion in new value, the running total should include the excluded count to finalize the running total, which is stored in the last value metadata field of the chunk.

As shown for demonstrative purposes, last value effectively, although not operationally, also is the sum of all final old values of all target vertices in the chunk. For example at time T3, the old values of chunk B1 finally were respectively one and three. Thus, last value effectively is 1+3=four as shown. Thread safety for populating new value and last value is inherent because each thread B1-3 only accesses its own chunk.

Thus, new value and last value are calculated in a multithreaded processing phase. A next processing phase is single threaded but can be pipelined with the previous phase as follows. For example, pipeline parallelism may entail concurrency of activities 502-503 by respective pipeline stages.

The single thread should process chunks B1-B3 in the order that those chunks occur in reverse destination array 430. Thus, the single thread should process chunk B1 first and B3 last. When starting to process a chunk, the single thread should wait until a thread of the previous phase has finished that chunk.

For example, the single thread should not begin chunk processing until thread B1 finishes chunk B1, even if thread B3 already finished chunk B3. Pipelining occurs when the single thread processes a chunk but another chunk is still being processed by another thread in the previous phase. For example if the previous phase finishes chunk B1 before chunk B3, then the single thread may process chunk B1 while chunk B3 is still being processed by thread B3 in the previous phase.

The single thread sequentially populates the chunk offset metadata field of all chunks, one chunk at a time, in ascending order. The arithmetic formula for chunk offset depends on which chunk. The chunk offset of first chunk B1 is zero as shown. The chunk offset of the second chunk B2 is the last value metadata field of the first chunk B1, which is four as shown.

As calculated by activity 502, the chunk offset of each subsequent chunk is the sum of the last value of the previous chunk plus the chunk offset of the previous chunk. For example for chunk B3, the last value of the previous chunk B2 is two as shown, and the chunk offset of the previous chunk B2 is four as shown. Thus, the chunk offset of chunk B3 is 2+4=six as shown.

When the single thread finishes, chunk metadata population is finished, and a final parallel population phase for reverse destination array 430 occurs as follows. Each chunk is processed in two parallel phases, one of which already occurred. In an embodiment, each chunk is processed by a same thread in both parallel phases.

For example, threads B1-B3 again each process their own respective chunks. In an embodiment, assignment of chunks to threads changes in the second parallel phase, such as when the threads returned to a thread pool between the two parallel phases. In an embodiment, the two parallel phases have different amounts of threads.

Activity 504 applies a chunk offset as follows. The second parallel phase finalizes the values in the reverse edge position vector of reverse destination array 430 as follows and as shown. New value is the demonstrative alias for the reverse edge position vector of reverse destination array 430 at the beginning of this phase. At the end of this phase, the reverse edge position vector of reverse destination array 430 has final values as shown that, for each chunk, are the new values incremented by the chunk offset of the chunk during activity 505.

For example, chunk B2 has a chunk offset of four. Thus, four is added to each of the new values of chunk B2. For example, the new value of target vertex H is zero. Thus in reverse destination array 430, the reverse edge position for target vertex H is 0+4=four as shown.

Thread safety for this arithmetic phase is inherent because each thread B1-3 only accesses its own chunk. As explained above, SPMD processes multiple chunks in parallel, but may be sequential within a chunk for earlier processing phases. In an embodiment, this arithmetic phase combines SPMD with single instruction multiple data (SIMD) for data parallelism for further acceleration by inelastic scaling during activity 507. In this case and during activity 506, some or all of final values in a chunk may be concurrently calculated because a same chunk offset is added to all new values in the chunk, which is amenable to vector hardware.

After all threads finish this phase, population of reverse destination array 430 is complete. The reverse CSR that contains reverse destination array 430 is not complete until reverse source array 440 is populated such as follows.

5.0 Parallel Population of Reverse Source Array

FIG. 6 depicts example activities that facilitate parallel population of data and/or metadata of reverse source array 440. An embodiment may implement some or all of activities 601-604 that may occur in any order. Some of activities 601-604 may be combined into one activity. As follows, FIGS. 4 and 6 demonstrate example configuration and operation of computer 400.

In an embodiment, population of reverse source array 440 is based on destination arrays 420 and 430 as follows. As explained above, old value operated as a shared counter of edges that terminate at a respective target vertex in reverse destination array 430. Parallel population of reverse source array 440 also uses a vector of shared counters as follows.

As discussed above, chunks A1-2 of forward destination array 420 were processed in parallel by threads A1-2 in an initial parallel phase. In the following final parallel phase, threads A1-2 or a same or different number of other concurrent threads again process chunks A1-2 in parallel as follows.

Each thread sequentially processes edges in its chunk by: a) detecting the vertex position of the target vertex of an edge in forward destination array 420, b) using that vertex position as an offset of that target vertex within reverse destination array 430, c) detecting, in the reverse edge position vector of reverse destination array 430, a first offset into reverse source array 440 of the subset of edges that terminate at that target vertex, and d) thread-safe mutation as follows.

Each edge that terminates at the target vertex should be populated into a separate adjacent row in reverse source array 440. Parallelism by threads A1-2 may cause edges terminating at the target vertex to be processed in an arbitrary order, which is tolerated. Because threads A1-2 process separate edges during activity 604, threads A1-2 should not share a same row in reverse source array 440.

Likewise, threads A1-2 should not leave any row empty in reverse source array 440. Thus, some coordination is needed to assign rows of reverse source array 440 for population by respective threads A1-2.

In an embodiment, each row of reverse destination array 430 is associated with a respective counter of how many edges that terminate at a respective target vertex have already been populated into adjacent rows of reverse source array 440. Each counter is initially zero and incremented by one as edges that terminate at the respective target vertex are populated into reverse source array 440.

In an embodiment during activity 605, those counters are thread safe by using an atomic instruction such as fetch-and-add or otherwise synchronized per counter such as explained above. For example when threads A1-2 respectively process edges O and S in respective chunks A1-2, same target vertex F may be contentious for selecting respective rows of reverse source array 440 for threads A1-2 to respectively populate. Such contention is prevented by threads A1-2 using a same atomic counter for target vertex F.

Based on the reverse edge position column of reverse destination array 430, threads A1-2 detect that edges that terminate at target vertex F begin at reverse edge position 1 in reverse source array 440. In this example, thread A1 already populated edge N in that position in reverse source array 440 and incremented target vertex F's counter from zero to one. In this example, thread A1 races ahead of thread A2, reads that one as the counter's value while processing edge O.

To calculate a position within reverse source array 440 for edge O, thread A1 sums the counter's value plus target vertex F's starting offset in reverse source array 440 and increments the counter by one during activity 601. Thus, thread A1 populates edge O at reverse edge position 1+1=two within reverse source array 440 as shown. Thus, edge O and eventually edge S are safely and atomically added to separate rows of reverse source array 440. Populating edge O in reverse source array 440 during activity 602 and/or 603 may entail copying the forward edge position of edge O from array 420 to array 440 as shown.

6.0 Examplary Embodiment

Here is an exemplary embodiment based on a modern relational DBMS (RDBMS) such as Oracle. This embodiment refines the previous examples that may further explain this embodiment. Thus, the following explanation of this embodiment is abridged to emphasize refinements. Limitations of this embodiment that are explained as requirements need not be requirements of the previous examples.

Vertices and edges may be persisted as table rows in a database of an RDBMS. Each row may contain a natural identifier such as a primary key. Each row may contain or be associated with a dense identifier such as a monotonically increasing serial number. In an embodiment, some identifiers are native to the RDBMS. Some implementation variants are presented later herein that may or may not depend on native identifiers. The following are two example ways that the RDBMS may provide native identifiers.

One way is for main-memory, columnar databases such as SAP Hannah, Actian Vector, and Vertica. These main-memory database systems typically already have a first-class identifier that can be used to access a specific value in a data column. Such identifiers are sequential and start from zero and thus are dense identifiers.

Oracle Database has a different way that uses hybrid storage as follows. Data is primarily stored as rows (i.e. row major) on disk but can optionally be cached in a main-memory columnar store (i.e. column major). In this case, a first-class sequential identifier starting from zero is not permanently associated with every row. Instead, each row is somewhat permanently associated with a respective disk address whose values may be non-contiguous and thus are sparse identifiers. For example, Oracle has ROWIDs.

The forward CSR structure is available to provide data for creation of the reverse CSR. In an embodiment, the forward CSR consists of two arrays. In an embodiment, a CSR structure entails more data in the context of an RDBMS as follows.

The source and destination arrays of a forward CSR are assumed to be segmented, which gives better control to the RDBMS when it comes to memory management. The segmented arrays are split into chunks that can be used as a unit of parallelism.

The forward source array contains offsets into the forward destination array (DSTOFFs), and the forward destination array contains offsets into the forward source array (SRCOFFs) when the edge type has a same vertex type for source and target vertex types. Since positions in the forward source array, i.e., SRCOFFs, start from 0 and are sequential, they are equal to the corresponding DENSEIDs from the vertex table. Variant 1 below may be for RDBMSes in which DENSEIDs are not available.

Element i in the forward source array points to the index in the forward destination array at which the out-neighbor list for source vertex i starts, and element i+1 in the forward source array points to the index in the forward destination array after which the out-neighbor list for forward source vertex i ends.

In addition to indexes from the forward source array, the forward destination array also stores the DENSEIDs of the rows of the edge table, referred to as the EDGED values.

Some of the arrays in this exemplary embodiment, such as the destination array in the forward CSR, contain pairs of elements that share the same index. This can be implemented through the use of a composite data type.

In this exemplary embodiment, the reverse CSR data structure is populated as follows. The reverse CSR data structure is more or less identical to the forward CSR data structure, except that the role of the source and destination arrays are reversed, as the reverse CSR makes it possible to quickly find in-neighbors instead of out-neighbors:

Element i in the reverse destination array points to the index in the reverse source array at which the in-neighbor list for destination vertex i starts, and element i+1 in the reverse destination array points to the index in the reverse source array after which the in-neighbor list for destination vertex i ends.

In addition to indexes from the reverse destination array, the reverse source array also stores the DENSEIDs of the rows of the edge table, referred to as the EDGEID values.

In this exemplary embodiment, the reverse CSR is built directly from the forward CSR if already available. Building the reverse CSR is done in the following steps 1-3.

Step 1 allocates both reverse destination and reverse source arrays that are full and/or have a final size but are unpopulated. The reverse destination array has as many elements as the source array from the forward CSR, (the number of rows in the vertex table) when the edge has a same vertex type at both ends. That means the size of the reverse destination array is already known and it can be allocated directly. Similarly, the reverse source array has as many elements as the destination array from the forward CSR (the number of rows in the edge table), which means it can also be immediately allocated. For both reverse arrays, allocations of individual chunks can be parallelized if the memory allocator supports it.

Step 2 populates the reverse CSR by computing the offsets into an array as follows. Step 2 computes the SRCOFF values stored in the reverse destination chunks, which are the offsets in the reverse source array at which the in-neighbors start for each destination vertex. The values of the SRCOFFs can be deduced from the number of in-neighbors of each vertex, because the difference between SRCOFF i+1 and SRCOFF i is the number of in-neighbors vertex i has. Finding the number of in-neighbors from the persistent relational tables could be done through SQL operations but, because a populated in-memory forward CSR is available, efficiency of step 2 is increased. After that, running sums of the number of in-neighbors need to be computed to obtain the SRCOFF values. Using multithreading to improve performance is desirable, when possible.

Step 2 is done through the following four sub-steps a-d. Sub-step a is multi-threaded for computing the number of incoming edges for each vertex using the forward CSR. All values in the destination array of the reverse CSR are initialized to 0. Threads are then spawned that each work from a single respective chunk of the source array of the forward CSR at a same time. Each thread follows each outgoing edge from each source vertex from the thread's chunk, and increments the element in the destination array of the reverse CSR that corresponds to the destination of each outgoing edge. Since multiple threads can increment the same value at the same time, atomic instructions provided by the hardware are used to perform increments. For instance, the first element in Destination Chunk 2 has 3 in-neighbors that come from source vertices that are spread out and likely to come from different chunks. This means that the three increments may have come from multiple threads, and atomic operations are necessary to avoid a lost update.

Sub-step b is multi-threaded for computing per-chunk running sums from the number of incoming edges. In this sub-step, each thread works on a single chunk from the destination array of the reverse CSR at a time. A local, zero-starting per-chunk running sum is computed. For example, the three first elements of destination chunk 1 have 3, 2, and 1 in-neighbors, respectively. After Sub-step b, the first four elements of Destination Chunk 1 will be 0, 3 (=0+3), 5 (=3+2) and 6 (=5+1). The last computed value (i.e. last value as presented earlier herein), 2398, is not part of the chunk: it is the total number of in-neighbors in the chunk and needs to be the first value (i.e. first new value as presented earlier herein) of the following chunk at the end of Step 2. At this point, the value is stored in a field of the chunk's metadata that is known below as LASTVAL and earlier herein as last value.

Sub-step c is single-threaded for computing chunk offsets as follows. CHUNKOFF values are also stored in the chunks' metadata and represent the offset at which the chunk starts, which can be computed as a zero-starting, chunk-level running sum of the LASTVAL values, with the following conditions. The CHUNKOFF value of Destination Chunk 1 is equal to the LASTVAL of Destination Chunk 0, and the CHUNKOFF value of Destination Chunk i with i>1 is equal to the sum of the CHUNKOFF and the LASTVAL of Destination Chunk i−1. After CHUNKOFF values are computed, LASTVAL values can be discarded. The CHUNKOFF value of Destination Chunk 2 is set to the LASTVAL of Destination Chunk 1: 2398, and the CHUNKOFF VALUE of Destination Chunk 3 is set to the sum of the CHUNKOFF and the LASTVAL of Destination Chunk 2: 3682 (2398+1284). Note that Sub-step c does not need to start after Sub-step b is completely over: it is possible to start computing the chunk-level running sum for Destination Chunk i as soon as Sub-step b for previous destination chunks (0 to i−1) is done.

Sub-step d is multi-threaded for computing final SRCOFF values. The final SRCOFF values can be computed with multiple threads, on a per-chunk basis: each thread simply adds the CHUNKOFF value to each element in the chunk. This operation can be hardware vectorized such as with SIMD. At the end of the sub-step, CHUNKOFF values can be discarded. Elements from Destination Chunk 1 are unchanged as the first chunk has no offset, but 2398 is added to all elements from Destination Chunk 2 as it is the CHUNKOFF value for that chunk.

After those four sub-steps a-d of step 2, reverse destination chunks contain their final values. Step 3 has sub-steps a-b. In order to ensure good performance, reverse source chunks are filled by multiple threads, with some threads potentially adding different EDGERID (e.g. edge offset into reverse source array) and DSTOFF values for the same source vertex. To handle conflicts, how many EDGERID/DSTOFF values have already been inserted for each element during this step should be tracked. For this, a new segmented array named curpos is allocated and initially zero filled during Step 3a of building the reverse CSR. Values from curpos are incremented atomically by using atomic instructions from the hardware.

Step 3b finishes reverse CSR population, which consists in filling the reverse source chunks with the EDGERID and DSTOFF values of the incoming edges and in-neighbors. This sub step leverages the forward CSR once more. Threads are spawned or repurposed, and each thread works on a chunk of the source array from the forward CSR. Each thread follows each outgoing edge from each source vertex of the chunk it is currently processing, and each time, the thread adds a new (EDGEID, DSTOFF) pair to the in-neighbors of the destination vertex the outgoing edge led it to. The position where the (EDGEID, DSTOFF) pair should be inserted into the source array of the reverse CSR is calculated as the sum of SRCOFF of the destination vertex the outgoing edge traversal led to and the value of cur_pos that accounts for previous insertions into the in-neighbor list. The EDGERID value is copied from the destination array of the forward CSR, and the DSTOFF value corresponds to the position of the source vertex in the source array of the forward CSR. When cur_pos is read for the operation, it is also incremented. Using atomic increments is necessary in order to avoid conflicts from other threads that might try to write EDGERID/DSTOFF values for the same destination vertex in the reverse CSR. After all EDGERID/DSTOFF values have been filled, the curpos array is not useful anymore and can therefore be freed.

Upon completing the three steps 1-3 presented above, the reverse CSR is fully populated. Since this is done entirely in memory with multiple threads, building the reverse CSR has a much lower overhead than building the forward CSR through SQL queries, as discussed later herein.

The above algorithm can work with any number of spawned threads, including only a single one, in which case it is sequential. However, note that since each thread is always working on one chunk at a time, using more threads than there are chunks in the destination array will result in some threads being idle. Consequently, a number of threads between one and the number of chunks in the destination array should be used. Choosing the exact number of threads to use is a logistic problem that depends on hardware, machine use, and decisions regarding various tradeoffs.

The following is a comparison of populating the forward versus the reverse CSR data structures. Efficiently building the forward CSR from the source and destination relational tables is as follows with steps I-III and especially as presented in related U.S. patent application Ser. No. 16/747,827.

Like in the reverse CSR population, in Step I, the source and destination arrays need to be allocated. The amount of memory to allocate for these arrays was known in the reverse CSR population that was relying on the pre-existing forward CSR, but this approach cannot be used to populate the forward CSR. The number of elements in the forward source and destination arrays is equal to the number of rows in the source vertex and edge relational tables, respectively. So long as the RDBMS does not cache table sizes and the source and target vertices have a same vertex type, the two following SQL queries need to be run to retrieve these numbers of rows:

select count(*) from vertex; select count(*) from edge;

Following that, memory allocation can take place. Chunk allocations can be done in parallel, similarly to what is done for the forward CSR.

In Step II, DSTOFF values in the source array have to be computed. As a reminder, in Step 2 of the reverse CSR population described above, filling SRCOFF values in the destination array involved finding the number of in-neighbors of each destination vertex using the forward CSR. This approach cannot be used here to find the number of out-neighbors of each source vertex. Instead, the number of out-neighbors for each source vertex can be found using the following query:

select src, count(*) from edge where edge.rowid group by src order by src;

A filter on ranges of rows from the edge table can be added to the query to split the work between multiple processes. Following this operation, the running sums of the out-degrees can be computed in parallel, similarly to what is done for in-degrees in the reverse CSR population.

In Step III, out-neighbors of each source vertex need to be found to fill the destination array. In Step 2 of the reverse CSR population, in-neighbors of each destination vertex were found by leveraging the forward CSR, but again this approach cannot be used here. Instead, a double JOIN query needs to be run to find out-neighbors:

select src.rowid, dst.rowid, edge.rowid from vertex src, vertex dst, edge etab where src.key=etab.src and dst.key=etab.dst where etab.rowid;

Again, filter on ranges of rows can be added to the query so that multiple processes can run part of it. Handling concurrency when filling the destination array can be done similarly to what is done for the reverse CSR when filling the source array, i.e., using a cur_pos segmented array and atomic instructions.

Steps II-III of populating the forward CSR use ORDER BY and a double JOIN, which are expensive operations. The following are important Variants 1-2 that are adapted for different RDBMS row identification schemes and/or different constraints on graph topology.

Variant 1 is for when the DENSEID identifier is not provided by the RDBMS. The reverse CSR population algorithm described above expects that the RDBMS provides, for each table, a sequential identifier that starts from 0, which is DENSEID. Variant 1 handles the case in which the database only provides an identifier that is not sequential and can start from any value. That identifier is SPARSEID.

While the forward and reverse CSRs could be built as described above even if the DENSEID identifier is not available, their usefulness would be limited as it would be impossible to identify the row in a vertex table that corresponds to a position in the source array of the forward CSR, or in the destination array of the reverse CSR. This means that it would be impossible to access vertex properties. To address this, in Variant 1, the source array of the forward CSR stores SRCIDs, which are the SPARSEIDs of each source vertex, and the destination array of the reverse CSR stores DSTIDs, which are the SPARSEIDs of each destination vertex. The reason this was not done with DENSEIDs is that they were equal to the indices in the array and could therefore be inferred. Even though the EDGEIDs in this variant store SPARSEIDs instead of DENSEIDs, they can be used in the same way as they were above to access edge properties.

Reverse CSR population above needs adjustment to work with Variant 1. In Step I above, the size of the destination array of the reverse CSR will be larger as the array also needs to accommodate DSTIDs. In Step II, DSTIDs in the destination array of the reverse CSR can be directly copied from SRCIDs in the source array of the forward CSR, in the same order, so long as the graph is homogenous, which means that the graph has only one vertex type and one edge type. In other words in a homogenous graph, the one edge type has the same vertex type for source and target vertices.

Variant 2 is for when an edge type may have different source and target vertex types. The reverse CSR population described above assumes that the graph is homogeneous, i.e., it contains a single vertex table and a single edge table. The RDBMS may also support heterogeneous graphs, that is, graphs with multiple vertex tables and/or multiple edge tables. In a heterogeneous graph, the source and destination columns in an edge table may point to two different vertex tables. Heterogeneous graphs have multiple benefits, notably in terms of performance. Heterogeneous graph support impacts the forward CSR as follows.

CSRs for different edge types may be daisy chained as follows. The SRCOFFs in the destination array of the forward CSR may not identify elements from the source array of the forward CSR, instead, they may identify elements from the source array of another forward CSR. Similarly, the DSTOFFs in the source array of the reverse CSR may identify elements from the destination array of the reverse CSR, instead, they may identify elements from the destination array of another reverse CSR. In that way, CSR pairs may be used as an operational chain for a path that traverses multiple edge types.

A graph query may traverse edges and vertices of various types to find a solution. Some types of edges and vertices may be relevant only for intermediate values but not as final destination vertices for the query. Last edges in a graph traversal may have a somewhat special CSR encoding, and those edges are known herein as leaves. Thus, there may be daisy chained CSRs that are used for particular query(s) or pattern(s). For example, distinct queries that traverse a same edge type may or may not share a same CSR pair for that edge type. Thus, an edge type may have multiple CSR pairs for different contextual uses.

Whether or not one CSR of a pair is a leaf depends on: a) the edge type of the CSR pair is the last edge type in a traversal, and b) the direction of the traversal. Here, the last edge type is based on the direction of the traversal, which may or may not be the same direction as the edges of the edge type. For a forward traversal, the destination array of the forward CSR of the last edge type encodes the last edges.

For a reverse traversal, the last edge type in the traversal is, somewhat counterintuitively, the first edge type in paths found by the traversal. For the reverse traversal, the source array of the reverse CSR of the first edge type in found paths encodes the last edges traversed to find those paths because the paths are traversed backwards.

As follows for a forward traversal, the destination array of the forward CSR of a leaf edge has a special encoding. Likewise for a reverse traversal, the source array of the reverse CSR of a leaf edge has a special encoding as follows.

If the forward CSR is for a leaf edge, its SRCOFFs will be replaced by identifiers for rows inside the destination table (DENSEIDs for the standard algorithm, and SPARSEIDs for Variant 1). Similarly, if the reverse CSR is a leaf, its DSTOFFs will be replaced by identifiers for rows inside the source table (DENSEIDs for the standard algorithm, and SPARSEIDs for Variant 1).

Variant 2 handles the heterogeneous case for the reverse CSR population. The following are modifications to the above algorithm. Step 1 needs to be modified because the size of the destination array of the reverse CSR may not be equal to the size of the source array of the corresponding forward CSR. Instead the following modifications may be necessary.

If the forward CSR is not a leaf, the destination array of the reverse CSR has as many elements as the source array such that the SRCOFFs in the destination array of the forward CSR identify elements from. The size of the elements may differ if the reverse CSR is a leaf in Variant 1, as the DSTOFFs are replaced with SPARSEIDs, which may be larger than offsets than DENSEIDs.

If the forward CSR is a leaf, its destination array will not identify elements from the source array of another CSR, instead, it will directly identify rows from a destination table: the number of SRCOFFs (and DSTIDs in Variant 1) in the destination array of the reverse CSR is equal to the number of rows in that table. If the number of rows in the destination table is not cached, it can be retrieved through a SQL query.

Regarding Step 2, there are two cases as follows. With the standard implementation, Step 2 does not require any modifications. Note that going through the forward CSRs leads to destination offsets that are in the range of the source array of the reverse CSR as created in Step 1.

If Variant 2 is combined with Variant 1, in Step 2, DSTIDs in the destination array of the reverse CSR are copies of the SRCIDs from source array that the SRCOFFs in the destination array of the corresponding forward CSR identify elements from.

Step 3 is left unchanged in Variant 2. Variant 2 is suited for an Oracle Database. In an embodiment, DENSEIDs are implemented in the main-memory columnar store (e.g. as volatile identifiers), and do not support the creation of forward and reverse CSRs for tables that are not loaded in memory.

7.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

7.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
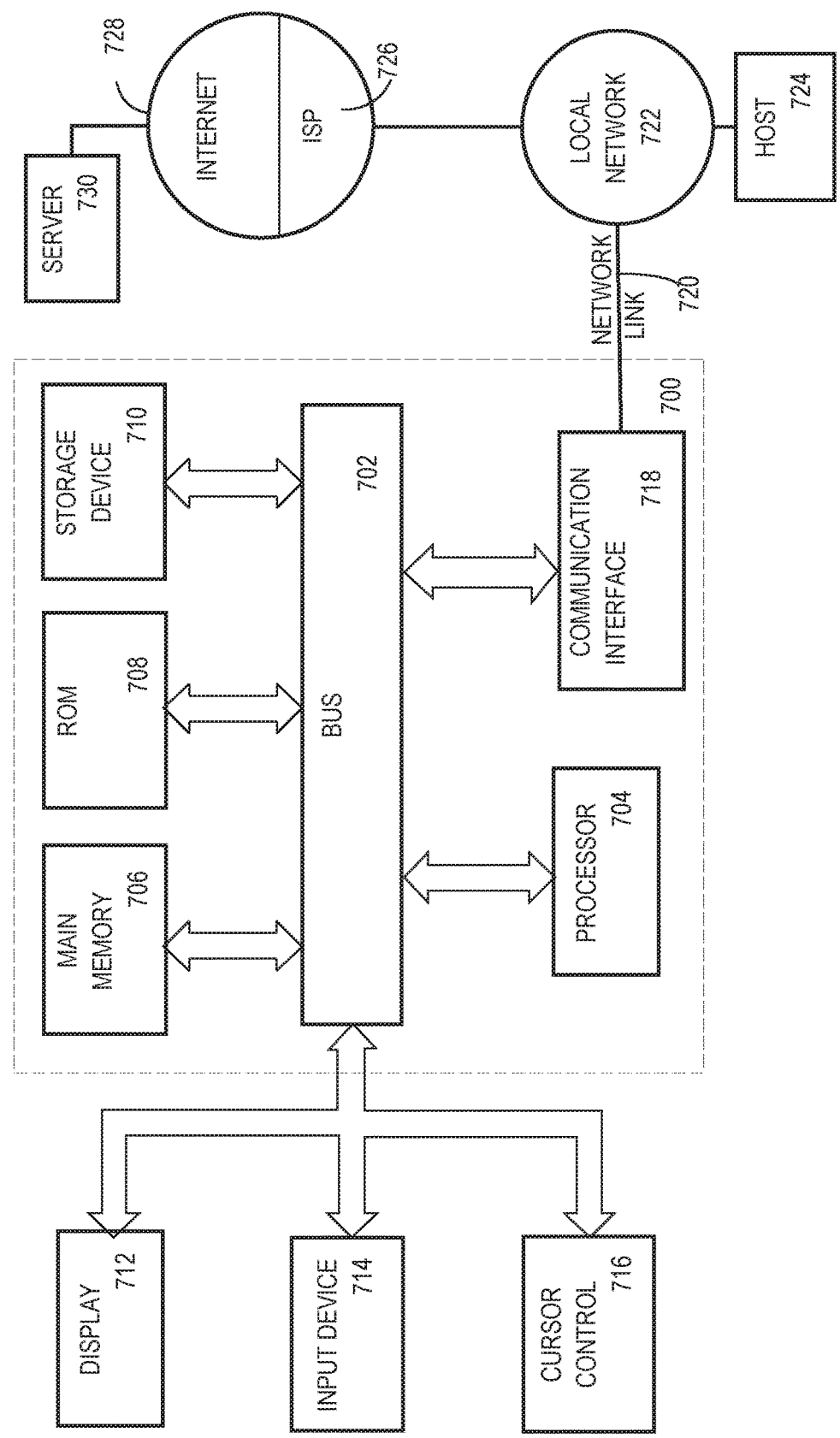
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
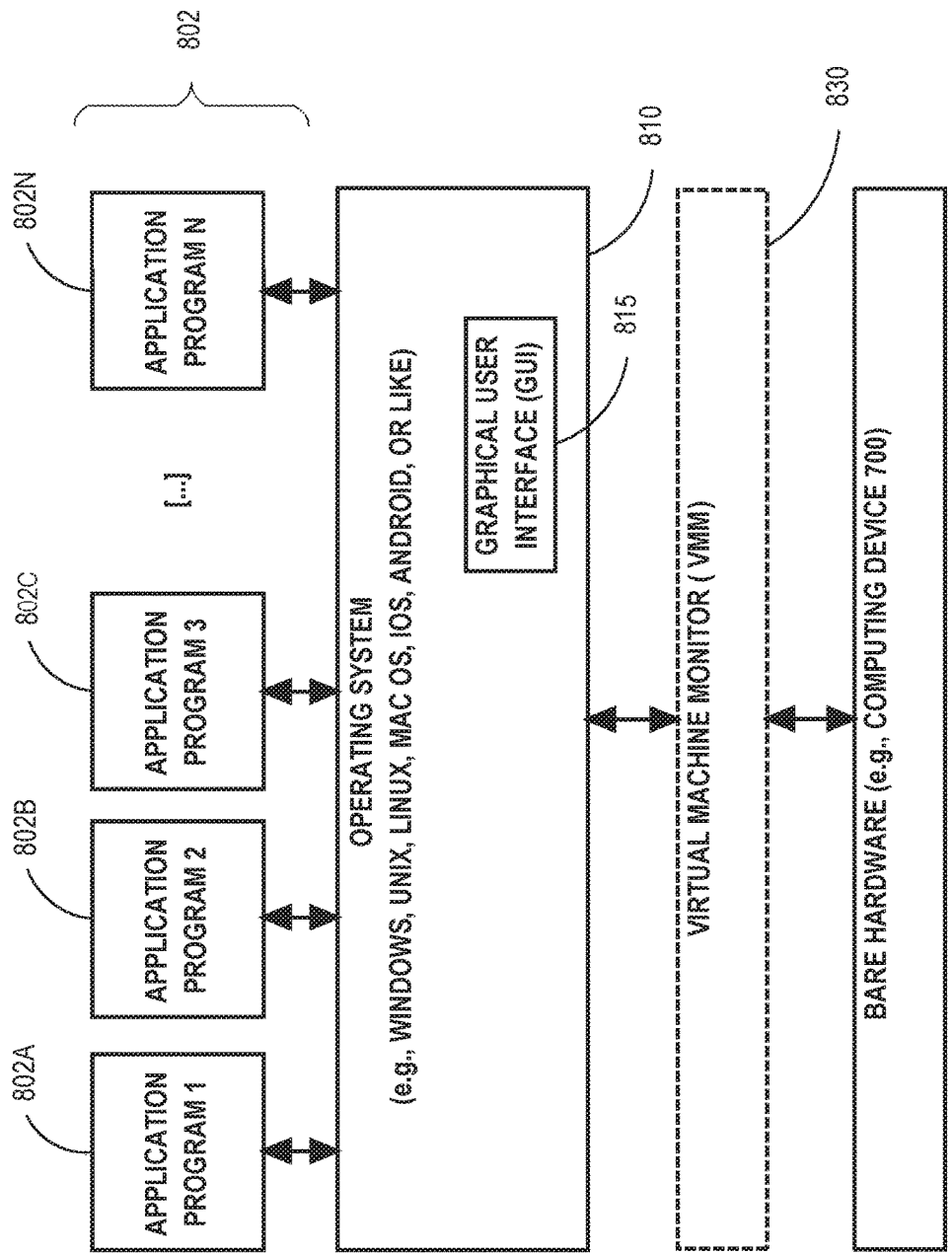
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
obtaining a mapping of a relational schema of a database to a graph data model, wherein:
the relational schema identifies one or more vertex tables that correspond to one or more respective vertex types in the graph data model and one or more edge tables that correspond to one or more respective edge types in the graph data model, and
each edge type in the one or more edge types is associated with a respective source vertex type of the one or more vertex types and a respective target vertex type of the one or more vertex types;
populating, based on said mapping, a forward compressed sparse row (CSR) representation for forward traversal of edges of an edge type of the one or more edge types, wherein each edge of the edge type:
originates at a source vertex of the source vertex type of the edge type, and
terminates at a target vertex of the target vertex type of the edge type,
wherein the forward CSR representation comprises a forward destination array that indicates which vertices of the target vertex type of the edge type terminate which respective edges of the edge type;
while populating the forward destination array for each edge of the edge type, incrementing a respective counter for the target vertex that terminates the edge;
populating, based on the forward CSR representation, a reverse CSR representation of the edge type for reverse traversal of the edges of the edge type, wherein the reverse CSR representation comprises:
a reverse source array that indicates which vertices of the source vertex type of the edge type originate which respective edges of the edge type, and
a reverse destination array that indicates a respective reverse range of offsets into the reverse source array for each vertex of the target vertex type of the edge type,
wherein for each edge of the edge type, said counter for the vertex that terminates the edge comprises a respective element of the reverse destination array for the vertex.

2. The method of claim 1 wherein:
said populating the forward CSR representation is further based on:
the vertex table that corresponds to the source vertex type of the edge type,
the vertex table that corresponds to the target vertex type of the edge type, and
the edge table that corresponds to the edge type;
said populating the reverse CSR representation does not comprise:
input/output (I/O), nor
accessing:
the vertex table that corresponds to the source vertex type of the edge type,
the vertex table that corresponds to the target vertex type of the edge type,
nor
the edge table that corresponds to the edge type.

3. The method of claim 1 wherein:
the forward CSR representation comprises
a forward source array that indicates a respective forward range of offsets into the forward destination array for each vertex of the source vertex type of the edge type.

4. The method of claim 3 wherein:
said populating the reverse CSR representation comprises counting respective edges of the edge type that terminate at each vertex of the target vertex type of the edge type;
said counting edges of the edge type that terminate at each vertex of the target vertex type of the edge type comprises scanning the forward destination array.

5. The method of claim 4 wherein
the reverse destination array is initially filled with zeros.

6. The method of claim 5 wherein said counting edges that terminate at each vertex comprises concurrently processing at least two edges.

7. The method of claim 6 wherein:
said at least two edges terminate at a same target vertex;
said concurrently processing said at least two edges comprises an atomic operation that increments said counter for said same target vertex.

8. The method of claim 5 wherein:
one or more arrays are processed as multiple chunks;
each chunk of the multiple chunks contains multiple elements;
the one or more arrays comprise at least one selected from the group consisting of: the forward destination array, the forward source array, the reverse destination array, and the reverse source array.

9. The method of claim 8 wherein:
the method further comprises replacing a respective old value of each element of each chunk of the reverse destination array with a respective new value;
when said element is the first element in the chunk, the new value is zero;
otherwise, the new value is a sum of the old value of the preceding element of the chunk plus the new value of said preceding element.

10. The method of claim 9 wherein said replacing the old value of each element of each chunk comprises concurrently processing at least two chunks.

11. The method of claim 9 wherein each chunk of the reverse destination array is associated with:
a last value that is a sum of said old values of the multiple elements of the chunk, and
a chunk offset that is:
zero when the chunk is the first chunk of the reverse destination array,
said last value of said first chunk when the chunk is the second chunk of the reverse destination array, otherwise, a sum of said last value of the previous chunk plus said chunk offset of the previous chunk.

12. The method of claim 11 further comprising concurrently:
calculating said sum of said last value of the previous chunk plus said chunk offset of the previous chunk, and
said replacing the old value of each element of said chunk.

13. The method of claim 11 further comprising incrementing each element of said chunk by the chunk offset of said chunk.

14. The method of claim 13 wherein said incrementing each element of said chunk comprises concurrently incrementing multiple elements of said chunk.

15. The method of claim 14 wherein said concurrently incrementing multiple elements of said chunk comprises single instruction multiple data (SIMD).

16. The method of claim 1 further comprising populating, based on a second forward CSR representation of a second edge type of the one or more edge types, a second reverse CSR representation of the second edge type for reverse traversal of edges of the second edge type.

17. The method of claim 16 wherein:
the forward CSR representation is a first forward CSR representation;
the reverse CSR representation is a first reverse CSR representation;
at least one selected from the group consisting of:
a) the second forward CSR representation comprises a forward destination array that contains a sparse identifier for each vertex of a second source vertex type of the second edge type that corresponds to a vertex table of the one or more vertex tables, and
b) the first reverse CSR representation comprises a reverse source array that contains a sparse identifier or a persistent dense identifier for each vertex of a second destination vertex type of the second edge type.

18. The method of claim 1 wherein at least one selected from the group consisting of:
a) the forward CSR representation comprises a forward destination array that contains a sparse identifier for each vertex of the destination vertex type of the edge type, and
b) the reverse CSR representation comprises a reverse source array that contains a sparse identifier or a persistent dense identifier for each vertex of the source vertex type of the edge type.

19. A method comprising:
obtaining a mapping of a relational schema of a database to a graph data model, wherein:
the relational schema identifies one or more vertex tables that correspond to one or more respective vertex types in the graph data model and one or more edge tables that correspond to one or more respective edge types in the graph data model, and
each edge type in the one or more edge types is associated with a respective source vertex type of the one or more vertex types and a respective target vertex type of the one or more vertex types;
populating, based on said mapping, a forward compressed sparse row (CSR) representation for forward traversal of edges of an edge type of the one or more edge types, wherein each edge of the edge type:
originates at a source vertex of the source vertex type of the edge type, and
terminates at a target vertex of the target vertex type of the edge type,
wherein the forward CSR representation comprises:
a forward destination array that indicates which vertices of the target vertex type of the edge type terminate which respective edges of the edge type, and
a forward source array that indicates a respective forward range of offsets into the forward destination array for each vertex of the source vertex type of the edge type;
populating, based on the forward CSR representation, a reverse CSR representation of the edge type for reverse traversal of the edges of the edge type, wherein the reverse CSR representation comprises:
a reverse source array that indicates which vertices of the source vertex type of the edge type originate which respective edges of the edge type, and
a reverse destination array that indicates a respective reverse range of offsets into the reverse source array for each vertex of the target vertex type of the edge type;
wherein said populating the reverse CSR representation comprises for each edge of the edge type:
calculating an offset into the reverse source array by summing a value of an element of the reverse destination array that corresponds to the target vertex of the edge plus a value of a respective counter for the target vertex;
based on said offset, storing, into an element of the reverse source array, at least one selected from the group consisting of:
an identifier of the edge, and
the offset, into the forward source array, of the source vertex of the edge.

20. The method of claim 19 wherein the identifier of the edge is copied from the forward destination array.

21. The method of claim 19 wherein at least one selected from the group consisting of:
said for each edge of the edge type, said calculating the offset into the reverse source array comprises concurrently calculating respective offsets into the reverse source array for at least two edges of the edge type, and
said for each edge of the edge type, said storing into the element of the reverse source array comprises concurrently storing into respective elements of the reverse source array for at least two edges of the edge type.

22. The method of claim 21 wherein:
said at least two edges terminate at a same vertex;
said concurrently processing said at least two edges comprises an atomic operation that increments said counter for said same vertex.

23. One or more non-transitory computer-readable media storing instructions that, when executed by one or more processors, cause:
obtaining a mapping of a relational schema of a database to a graph data model, wherein:
the relational schema identifies one or more vertex tables that correspond to one or more respective vertex types in the graph data model and one or more edge tables that correspond to one or more respective edge types in the graph data model, and
each edge type in the one or more edge types is associated with a respective source vertex type of the one or more vertex types and a respective target vertex type of the one or more vertex types;
populating, based on said mapping, a forward compressed sparse row (CSR) representation for forward traversal of edges of an edge type of the one or more edge types, wherein each edge of the edge type:

originates at a source vertex of the source vertex type of the edge type, and terminates at a target vertex of the target vertex type of the edge type, wherein the forward CSR representation comprises a forward destination array that indicates which vertices of the target vertex type of the edge type terminate which respective edges of the edge type;

while populating the forward destination array for each edge of the edge type, incrementing a respective counter for the target vertex that terminates the edge;

populating, based on the forward CSR representation, a reverse CSR representation of the edge type for reverse traversal of the edges of the edge type, wherein the reverse CSR representation comprises:

a reverse source array that indicates which vertices of the source vertex type of the edge type originate which respective edges of the edge type, and a reverse destination array that indicates a respective reverse range of offsets into the reverse source array for each vertex of the target vertex type of the edge type, wherein for each edge of the edge type, said counter for the vertex that terminates the edge comprises a respective element of the reverse destination array for the vertex.

24. The one or more non-transitory computer-readable media of claim 23 wherein:

said populating the forward CSR representation is further based on:

the vertex table that corresponds to the source vertex type of the edge type, the vertex table that corresponds to the target vertex type of the edge type, and the edge table that corresponds to the edge type;

said populating the reverse CSR representation does not comprise:

input/output (I/O), nor accessing:

the vertex table that corresponds to the source vertex type of the edge type, the vertex table that corresponds to the target vertex type of the edge type, nor the edge table that corresponds to the edge type.

25. The one or more non-transitory computer-readable media of claim 23 wherein:

the forward CSR representation comprises a forward source array that indicates a respective forward range of offsets into the forward destination array for each vertex of the source vertex type of the edge type.

26. The one or more non-transitory computer-readable media of claim 25 wherein:

said populating the reverse CSR representation comprises counting respective edges of the edge type that terminate at each vertex of the target vertex type of the edge type;

said counting edges of the edge type that terminate at each vertex of the target vertex type of the edge type comprises scanning the forward destination array.

27. The one or more non-transitory computer-readable media of claim 26 wherein:

the reverse destination array is initially filled with zeros.

28. The one or more non-transitory computer-readable media of claim 27 wherein:

one or more arrays are processed as multiple chunks;

each chunk of the multiple chunks contains multiple elements;

the one or more arrays comprise at least one selected from the group consisting of: the forward destination array, the forward source array, the reverse destination array, and the reverse source array.

29. The one or more non-transitory computer-readable media of claim 28 wherein:

the instructions further cause replacing a respective old value of each element of each chunk of the reverse destination array with a respective new value;

when said element is the first element in the chunk, the new value is zero;

otherwise, the new value is a sum of the old value of the preceding element of the chunk plus the new value of said preceding element.

30. The one or more non-transitory computer-readable media of claim 29 wherein each chunk of the reverse destination array is associated with:

a last value that is a sum of said old values of the multiple elements of the chunk, and a chunk offset that is:

zero when the chunk is the first chunk of the reverse destination array, said last value of said first chunk when the chunk is the second chunk of the reverse destination array, otherwise, a sum of said last value of the previous chunk plus said chunk offset of the previous chunk.

31. The one or more non-transitory computer-readable media of claim 30 wherein the instructions further cause incrementing each element of said chunk by the chunk offset of said chunk.

32. The one or more non-transitory computer-readable media of claim 23 wherein the instructions further cause populating, based on a second forward CSR representation of a second edge type of the one or more edge types, a second reverse CSR representation of the second edge type for reverse traversal of edges of the second edge type.

33. The one or more non-transitory computer-readable media of claim 23 wherein at least one selected from the group consisting of:

a) the forward CSR representation comprises a forward destination array that contains a sparse identifier for each vertex of the destination vertex type of the edge type, and b) the reverse CSR representation comprises a reverse source array that contains a sparse identifier or a persistent dense identifier for each vertex of the source vertex type of the edge type.

34. One or more non-transitory computer-readable media storing instructions that, when executed by one or more processors, cause:

obtaining a mapping of a relational schema of a database to a graph data model, wherein:

the relational schema identifies one or more vertex tables that correspond to one or more respective vertex types in the graph data model and one or more edge tables that correspond to one or more respective edge types in the graph data model, and each edge type in the one or more edge types is associated with a respective source vertex type of the one or more vertex types and a respective target vertex type of the one or more vertex types;

populating, based on said mapping, a forward compressed sparse row (CSR) representation for forward traversal of edges of an edge type of the one or more edge types, wherein each edge of the edge type:
  originates at a source vertex of the source vertex type of the edge type, and
  terminates at a target vertex of the target vertex type of the edge type,
  wherein the forward CSR representation comprises:
    a forward destination array that indicates which vertices of the target vertex type of the edge type terminate which respective edges of the edge type, and
    a forward source array that indicates a respective forward range of offsets into the forward destination array for each vertex of the source vertex type of the edge type;
populating, based on the forward CSR representation, a reverse CSR representation of the edge type for reverse traversal of the edges of the edge type, wherein the reverse CSR representation comprises:
  a reverse source array that indicates which vertices of the source vertex type of the edge type originate which respective edges of the edge type, and
  a reverse destination array that indicates a respective reverse range of offsets into the reverse source array for each vertex of the target vertex type of the edge type;
wherein said populating the reverse CSR representation comprises for each edge of the edge type:
  calculating an offset into the reverse source array by summing a value of an element of the reverse destination array that corresponds to the target vertex of the edge plus a value of a respective counter for the target vertex;
  based on said offset, storing, into an element of the reverse source array, at least one selected from the group consisting of:
    an identifier of the edge, and
    the offset, into the forward source array, of the source vertex of the edge.

35. The one or more non-transitory computer-readable media of claim 32 wherein:
  the forward CSR representation is a first forward CSR representation;
  the reverse CSR representation is a first reverse CSR representation;
  at least one selected from the group consisting of:
    a) the second forward CSR representation comprises a forward destination array that contains a sparse identifier for each vertex of a second source vertex type of the second edge type that corresponds to a vertex table of the one or more vertex tables, and
    b) the first reverse CSR representation comprises a reverse source array that contains a sparse identifier or a persistent dense identifier for each vertex of a second destination vertex type of the second edge type.

\* \* \* \* \*

UNITED STATES PATENT AND TRADEMARK OFFICE
CERTIFICATE OF CORRECTION

| | |
|---|---|
| PATENT NO. | : 11,537,579 B2 |
| APPLICATION NO. | : 16/816686 |
| DATED | : December 27, 2022 |
| INVENTOR(S) | : Lozi et al. |

It is certified that error appears in the above-identified patent and that said Letters Patent is hereby corrected as shown below:

On the Title Page

On page 2, Column 1, under U.S. Patent Documents, Line 31, below "16/27", insert -- 2019/0303482 A1 10/2019 Balkesen et al. --, therefor.

On page 2, Column 1, under Other Publications, Line 15, delete ""Pseudoclumns"," and insert -- "Pseudocolumns", --, therefor.

On page 2, Column 2, under Other Publications, Line 17, delete "Identifer"," and insert -- Identifier", --, therefor.

On page 2, Column 2, under Other Publications, Line 19, delete "identifer," and insert -- identifier, --, therefor.

In the Specification

In Column 25, Line 41, delete "SQL/WL" and insert -- SQL/XML --, therefor.

Signed and Sealed this
Twenty-fourth Day of October, 2023

Katherine Kelly Vidal
*Director of the United States Patent and Trademark Office*